United States Patent [19]

Stille

[11] Patent Number: 5,017,677

[45] Date of Patent: May 21, 1991

[54] POLYQUINOLINE COPOLYMERS

[75] Inventor: John K. Stille, Fort Collins, Colo.

[73] Assignee: Colorado State University Research Foundation, Fort Collins, Colo.

[21] Appl. No.: 273,355

[22] Filed: Nov. 18, 1988

[51] Int. Cl.$^5$ ............ C08G 8/02; C08G 69/49; C08G 75/00; C08G 79/02

[52] U.S. Cl. ............ 528/125; 528/127; 528/128; 528/150; 528/183; 528/220; 528/229; 528/337; 528/377; 528/425; 528/540

[58] Field of Search ............ 528/125, 127, 229, 220, 528/128, 150, 103, 339, 327; 525/425, 540

[56] References Cited

U.S. PATENT DOCUMENTS

| | | | |
|---|---|---|---|
| 3,661,850 | 5/1972 | Stille | 428/524 |
| 4,000,187 | 12/1976 | Stille | 428/524 |
| 4,207,407 | 6/1980 | Helminiak et al. | 525/425 |
| 4,377,546 | 3/1983 | Helminiak et al. | 264/232 |

OTHER PUBLICATIONS

J. K. Stille, "Polyquinolines," *Macromolecules*, 1981, 14, 870–880.

Beever et al., "Synthesis and Thermal Properties of Aromatic Polymers Containing 3,6-Quinoline Units in the Main Chain," Macromolecules, vol. 12, No. 6, Nov.-Dec. 1979.

Stille et al., "Polyquinolines Containing Fluorene and Anthrone Cardo Units: Synthesis and Properties," Macromolecules, vol. 14, No. 3, May–Jun. 1981.

Sutherlin et al., "Rigid-Rod Polyquinolines with Extended Aryl Ether Pendent Groups: An Approach to Solubility Enhancement," Macromolecules, vol. 18, No. 12, 1985.

Norris et al., "Synthesis and Solution Properties of Phenylated Polyquinolines. Utilization of the Friedlander Reaction for the Synthesis of Aromatic Polymers Containing 2,6-Quinoline Units in the Main Chain," Macromolecules, vol. 9, No. 3, May–Jun. 1976.

Beever et al., "Polyquinolines: A Class of Rigid-Chain Polymers," Journal of Polymer Science; Polymer Symposium 65, 41–53, (1978).

Sybert et al., "Synthesis and Properties of Rigid-Rod Polyquinolines," Macromolecules, vol. 14, No. 3, May–Jun. 1981.

*Primary Examiner*—John Kight, III
*Assistant Examiner*—P. Hampton-Hightower
*Attorney, Agent, or Firm*—Christie, Parker & Hale

[57] ABSTRACT

Polyquinoline copolymers and mixtures of polyquinoline homopolymers and copolymers having unique properties are provided. The copolymers can include random copolymers, block copolymers, and tri-block copolymers.

69 Claims, No Drawings

POLYQUINOLINE COPOLYMERS

This invention was made with government support under Air Force Office of Scientific Research Contract No. F49620-86-C-0102 awarded by the Air Force. The United States government has certain rights in this invention.

FIELD OF THE INVENTION

This invention relates to copolymeric materials containing the characteristic quinoline-type structure, and to mixtures of polyquinoline polymers. The present invention further relates to methods of making the aforementioned polymeric compounds.

BACKGROUND OF THE INVENTION

U.S. Pat. No. 4,000,187 disclosed a polymeric composition consisting of recurring, substituted quinoline groups, as well as methods of preparing such polymers. U.S. Pat. No. 4,000,187 is incorporated herein by this reference. As is described in the patent, polyquinoline homopolymers can be prepared from the reaction of (a) a type AA compound, an aromatic amino carbonyl containing two sets of ortho-amino carbonyl functions attached to an aromatic nucleus, selected from the group of type AA compounds consisting of structures represented by the formulas:

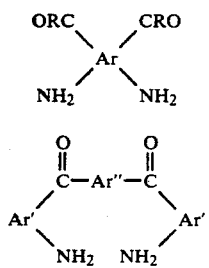

wherein R is hydrogen or aryl, and the Ar, Ar', and Ar" are aryl groups, with (b) a type BB compound, a bis methylene ketone compound, selected from the group of type BB compounds consisting of the structures represented by the formulas:

$$R'-\overset{O}{\overset{\|}{C}}-CH_2-Ar''-CH_2-\overset{O}{\overset{\|}{C}}-R' \quad (3) \text{ or}$$

$$R-CH_2-\overset{O}{\overset{\|}{C}}-Ar''-\overset{O}{\overset{\|}{C}}-CH_2-R \quad (4) \text{ or}$$

$$R-CH_2-\overset{O}{\overset{\|}{C}}-Ar''-CH_2-\overset{O}{\overset{\|}{C}}-R' \quad (5) \text{ or}$$

$$R-CH_2-\overset{O}{\overset{\|}{C}}-\overset{O}{\overset{\|}{C}}-CH_2-R \quad (6) \text{ or}$$

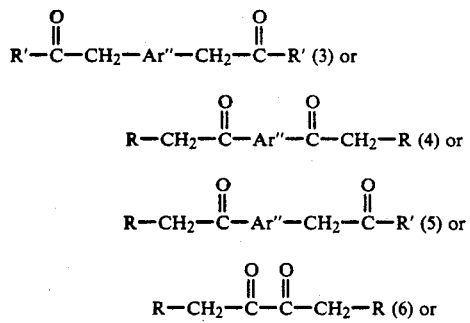

wherein R is hydrogen or aryl, R' is aryl, and Ar" and Ar''' are aryl groups.

Subsequently, it has been reported in the literature (J. K. Stille, *Macromolecules*, 1981, 14, 870-880) that related polyquinoline polymers can be prepared from the reaction of a compound selected from the group of type AB compounds consisting of aromatic compounds containing one set of ortho-amino carbonyl functions, as well as one methylene ketone function attached to an aromatic nucleus, selected from the group of type AB compounds consisting of structures represented by the formulas:

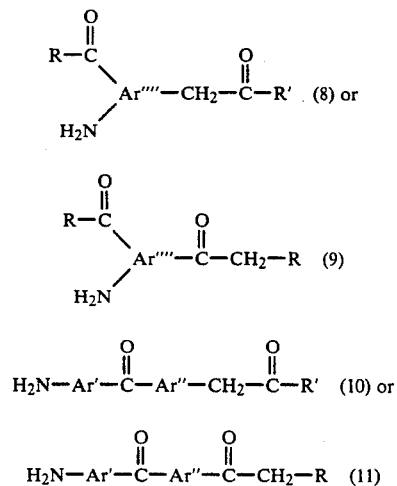

$$H_2N-Ar'-\overset{O}{\overset{\|}{C}}-Ar''-CH_2-\overset{O}{\overset{\|}{C}}-R' \quad (10) \text{ or}$$

$$H_2N-Ar'-\overset{O}{\overset{\|}{C}}-Ar''-\overset{O}{\overset{\|}{C}}-CH_2-R \quad (11)$$

wherein R is hydrogen or aryl, R' is Aryl, and Ar', Ar" and Ar'''' are aryl groups.

The methods disclosed in U.S. Pat. No. 4,000,187, and in the above-described literature reference, relate to preparation of a variety of polyquinoline polymers with varying physical properties. Most of the aforementioned polymers are homopolymers; i.e., most are polymers containing regularly recurring monomer units which can be represented schematically as:

$$-D-D-D-D-D-D- \quad \text{or} \quad -(D)_{\overline{n}}-$$

wherein D represents a recurring monomer unit. In such polymers, the monomer units usually consist of at least one quinoline moiety, with or without substituents, connected to two identical, adjacent, monomer units. Most of the homopolymers are prepared by allowing a single type AA compound to react with an equimolar amount of a single type BB compound, or alternatively, are from the reaction of a single type AB compound.

Some of the polyquinoline homopolymers previously disclosed or reported in the literature are rigid-rod polyquinoline polymers. Rigid-rod polymers are defined as having a rigid-rod backbone formed from a plurality of monomer units joined together by parallel, covalent bonds, such as carbon-carbon covalent bonds, such that the longitudinal axis of all the covalent bonds between the monomer units is substantially parallel, resulting in a polymer backbone that is linear and substantially straight. Rigid-rod polyquinolines consist of quinoline units, with or without substituents, connected in an extended polymer chain through covalent bonds, such as in the following catenations:

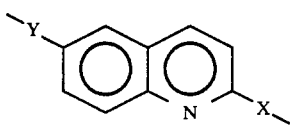

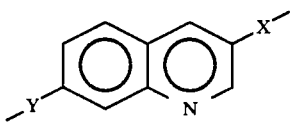

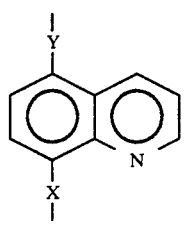

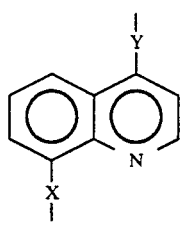

wherein X and Y represent direct covalent bonds to adjacent quinoline units, or X and Y may be any groups which permit a substantially linear linkage to adjacent quinoline groups. For example, X and Y may be 1,4-phenylene or 4,4'-biphenyl. All polyquinoline homopolymers which are not included in the class of rigid-rod polyquinoline homopolymers are referred to as non-rigid-rod polyquinoline homopolymers.

The particular type AA, type BB, and type AB compounds employed as starting materials for the preparation of any particular polyquinoline homopolymer determines whether the resulting polymer is a rigid-rod polyquinoline homopolymer or a non-rigid-rod polyquinoline homopolymer. Thus, precursors to polyquinoline polymers are divided between compounds which can be precursors for rigid-rod polyquinoline homopolymers, or compounds which cannot be precursors for rigid-rod polyquinoline homopolymers A compound which can be a precursor for a rigid-rod polyquinoline homopolymer is referred to as a "rigid-rod precursor compound," i.e., a rigid-rod type AA compound, a rigid-rod type BB compound, or a rigid-rod type AB compound. Similarly, a compound which cannot be a precursor for a rigid-rod polyquinoline homopolymer is referred to as a "non-rigid-rod precursor compound," i.e., a non-rigid-rod type AA compound, a non-rigid-rod type BB compound, or a non-rigid-rod type AB compound. It should be noted that certain specific combinations of rigid-rod precursor compounds result in the production of non-rigid-rod polyquinoline homopolymers, e.g.:

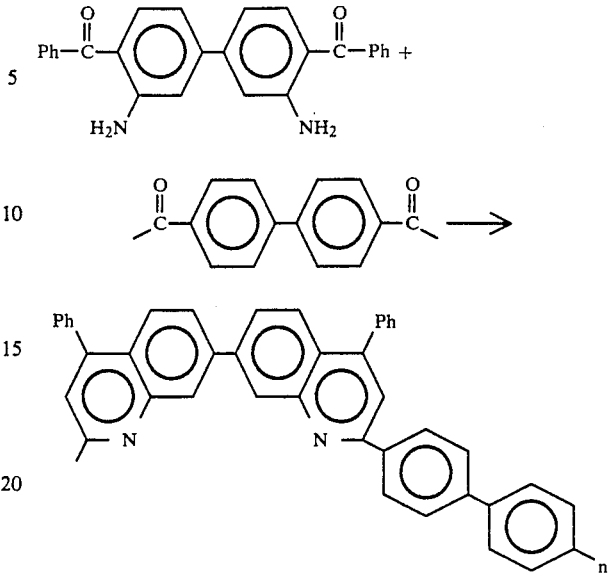

where the substituent Ph is defined herein as a phenyl group ($C_6H_5$).

According to U.S. Pat. No. 4,000,187, rigid-rod polyquinoline homopolymers can be prepared only by allowing a single, rigid-rod type AA compound to react with an equimolar amount of a single, rigid-rod type BB compound. Any other combination of type AA and type BB compounds in which at least one of the compounds is a non-rigid-rod compound results in formation of a non-rigid-rod polyquinoline homopolymer. In a similar fashion, use of a rigid-rod type AB compound results in a rigid-rod polyquinoline homopolymer, while use of a non-rigid-rod type AB compound yields a non-rigid-rod polyquinoline homopolymer.

A variety of both rigid-rod and non-rigid-rod polyquinoline homopolymers can be prepared according to the methods disclosed in both U.S. Pat. No. 4,000,187 and the above-described literature reference. Such homopolymers exhibit a wide range of physical properties. The contrast between rigid-rod polyquinoline homopolymers and non-rigid-rod polyquinoline homopolymers is especially notable. Most rigid-rod polyquinoline polymers are soluble only in strong acid solvents, exhibit remarkably high melting and decomposition temperatures and cannot be melt processed. In contrast, some non-rigid-rod polyquinoline homopolymers are soluble in common organic solvents, exhibit glass transition temperatures which are notably lower than for rigid-rod polyquinoline homopolymers, and can be melt processed into fibers, etc.

The number of different polyquinoline polymers which can be attained is limited by the number of type AA, type BB, and type AB compounds. Furthermore, the range of physical properties attainable with polyquinoline homopolymers is limited by the number of homopolymers which can be prepared. For example, rigid-rod polyquinoline homopolymers are expected to be especially useful in applications necessitating superior mechanical strength. However, the utility of rigid-rod polyquinoline homopolymers may be greatly limited by the difficulty in processing such materials: no rigid-rod polyquinoline homopolymers are known which can be processed from common organic solvents or which can be melt processed.

It is desirable, therefore, to provide (1) polyquinoline polymers other than homopolymers which can be utilized to prepare high quality, high temperature resistant molding and laminating resins, adhesive compositions, films, and fibers; (2) polyquinoline polymers which exhibit chemical and physical properties not attainable with polyquinoline homopolymers; (3) methods for preparing copolymers of polyquinoline polymers; (4) methods for preparing multi-block polyquinoline copolymers; (5) methods for preparing tri-block polyquinoline copolymers; (6) and methods for preparing mixtures of polyquinoline polymers.

SUMMARY OF THE INVENTION

In one exemplary embodiment of practice of this invention, a polyquinoline copolymer composition is provided which comprises the reaction product of mixtures of compounds selected from the group consisting of type AA, type BB, and type AB compounds. Such mixtures are selected from the group consisting of (1) one or more types of AA compounds, one or more types of BB compounds and one or more types of AB compounds; (2) one or more types of AA compounds and one or more types of BB compounds, where the total number of different types of AA and BB compounds is three or greater and (3) two or more types of AB compounds.

The type AA compounds are aromatic compounds containing two sets of ortho-amino carbonyl functions attached to an aromatic nucleus. The type AA compounds useful in practice of this invention are selected from the group consisting of structures represented by the formulas:

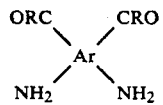 (1)

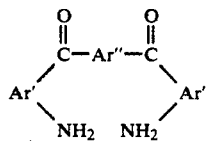 (2)

The type BB compounds are aromatic compounds containing two methylene ketone functions attached to an aromatic nucleus. The type BB compounds useful in practice of this invention are selected from the group consisting of structures represented by the formulas:

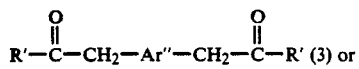 (3) or

 (4) or

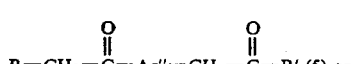 (5) or

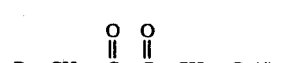 (6) or

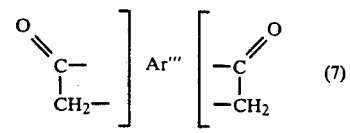 (7)

The type AB compounds are aromatic compounds containing one set of ortho-amino carbonyl functions as well as one methylene ketone function attached to an aromatic nucleus. The type AB compounds useful in practice of this invention are selected from the group consisting of structures represented by the formulas:

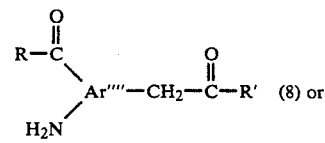 (8) or

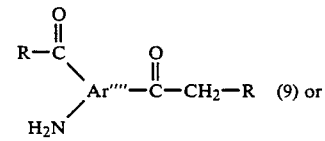 (9) or

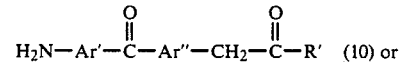 (10) or

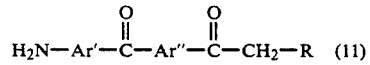 (11)

For the type AA, BB and AB compounds, R is hydrogen or aryl, R' is aryl, and Ar', Ar'', Ar''' and Ar'''' are aryl groups.

The polyquinoline copolymers provided in accordance with this invention may be random copolymers, block copolymers, or tri-block copolymers. The copolymers may contain all rigid rod components, all non-rigid-rod components, or both rigid-rod and non-rigid-rod components.

In another exemplary embodiment of practice of this invention, a polyquinoline mixture composition is provided wherein the mixture includes more than one polyquinoline homopolymer, or more than one polyquinoline copolymer, or both polyquinoline homopolymers and copolymers.

DETAILED DESCRIPTION

The present invention resides in the discovery that previously unknown polyquinoline polymer compositions, consisting of copolymers or mixtures, can be prepared, that the new materials have chemical and physical properties notably different from that obtainable with known polyquinoline homopolymers, and that the new polyquinoline polymeric materials will be useful for a variety of applications. The polyquinoline copolymers and mixtures provided in accordance with practice of this invention are suitable for use, for example, as thermally stable laminating resins, adhesive compositions, coating materials, films, fibers, high temperature metal adhesives, particularly for aluminum, steel, and titanium alloys, and high temperature electrical insulators, foams, ablative materials and rocket nozzles.

The polyquinoline copolymers and the homopolymers, which can be blended together or with the copolymers to form the mixtures of this invention, are prepared from type AA, type BB and type AB compounds. The type AA, BB and AB compounds are referred to herein as "precursor compounds" or "precursors" for the polyquinoline polymers of this invention.

The type AA compounds useful in practice of this invention are aromatic amino carbonyl compounds containing two sets of ortho-amino aldehyde or ortho-amino ketone functions attached to an aromatic nucleus. The type AA compounds are selected from the group consisting of structures represented by the formulas:

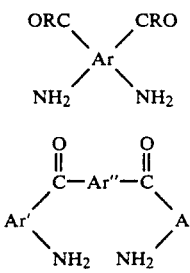

wherein R is hydrogen, or aryl, Ar is any aryl in which the positions of attachment of each set of carbonyl and amino functions are ortho, Ar' is any aryl in which the positions of attachment of the carbonyl and amino functions are ortho and Ar'' is any connecting aryl group.

The type BB compounds useful in practice of this invention are bis methylene ketone compounds having a methylene group adjacent each ketone function. The type BB compounds are selected from the group consisting of the structures represented by the formulas:

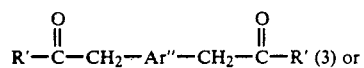

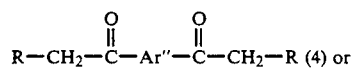

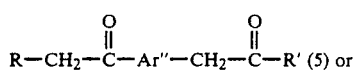

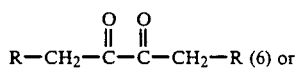

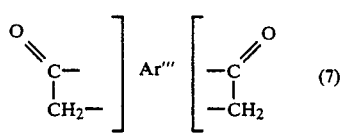

wherein R is hydrogen or aryl, R' is aryl, Ar'' is as described above for the type AA compounds and Ar''' is an aryl group, four positions of which are occupied by connection of the methylene carbonyl functions.

The type AB compounds useful in practice of this invention are aromatic compounds containing one set of ortho-amino carbonyl functions as well as one methylene ketone function attached to an aromatic nucleus. The type AB compounds are selected from the group consisting of structures represented by the formulas:

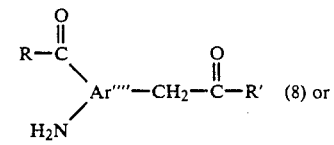

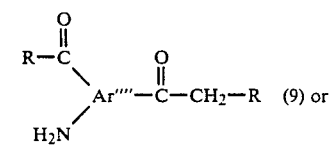

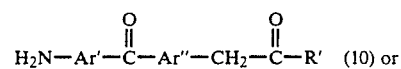

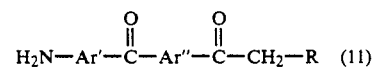

wherein R is hydrogen or aryl, R' is aryl, Ar', Ar'' are as described above for the type AA and BB compounds, and Ar'''' is an aryl group in which the positions of attachment of the set of carbonyl and amino functions is ortho.

Following the methods taught in U.S. Pat. No. 4,000,187, the polyquinoline materials provided in practice of the present invention are produced by allowing aromatic amino carbonyl-containing compounds to react with methylene ketone-containing compounds, as defined above for the type AA, type BB, and type AB compounds. The present invention results in polyquinoline copolymers, polyquinoline block copolymers, polyquinoline tri-block copolymers, or mixtures of polyquinoline polymers.

The type AA compounds, as defined above, are aromatic amino carbonyl compounds containing two sets of orthoamino ketone functions. The type AA compounds provided in accordance with practice of this invention include rigid-rod type AA compounds and non-rigid-rod type AA compounds. Examples of such rigid-rod and non-rigid-rod type AA compounds are as follows:

| RIGID-ROD TYPE AA | NON-RIGID-ROD TYPE AA |
|---|---|
| 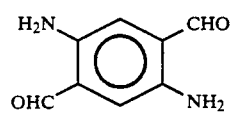 | 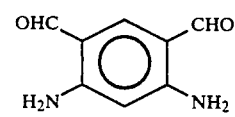 |
| 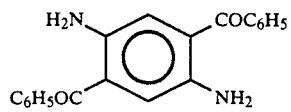 | 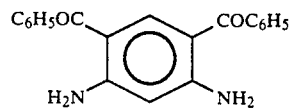 |

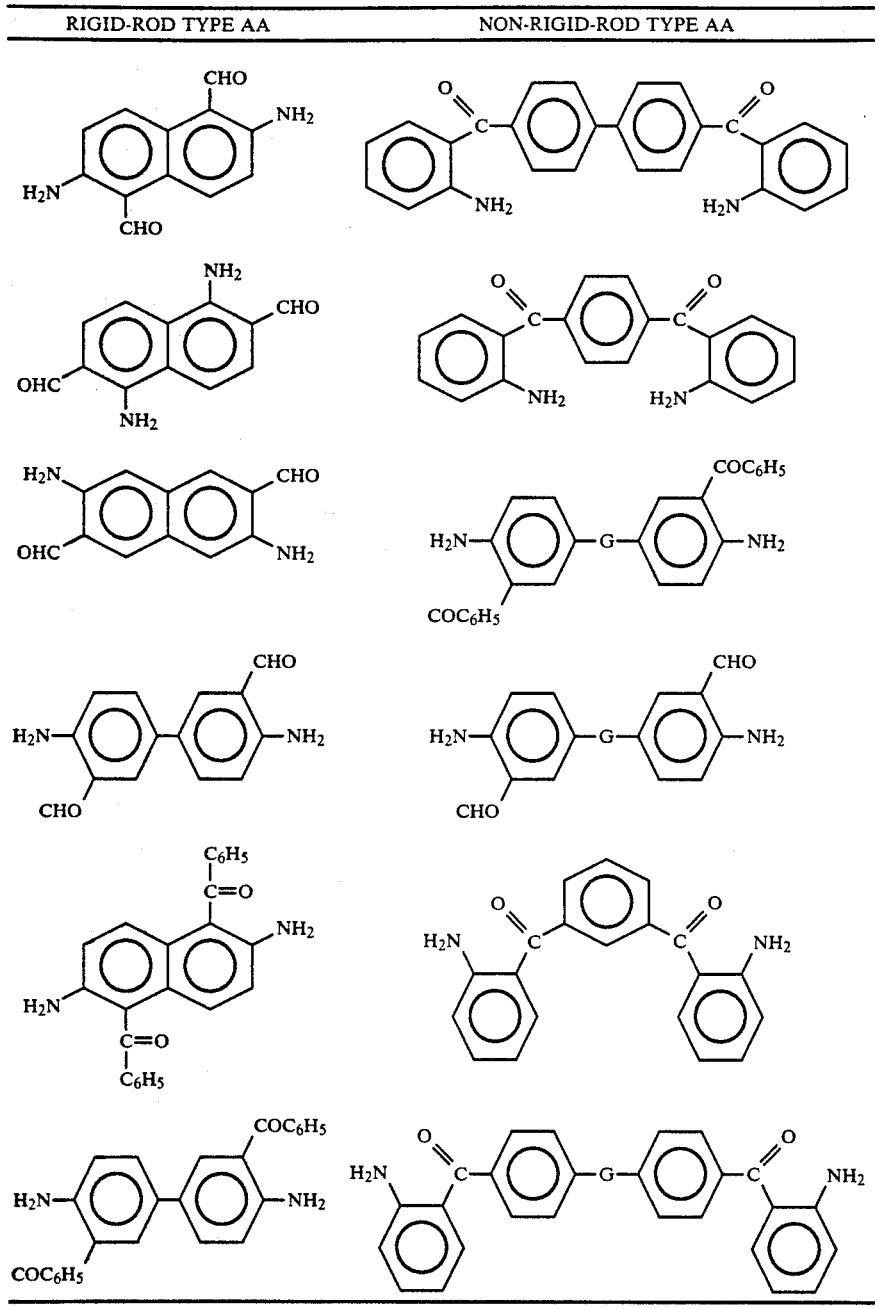

The symbol G represents a divalent group selected from the group consisting of alkylene, arylene, aralkylene, alkarylene, oxygen, sulfur, sulfoxide, sulfone, dialkylsilicon and diarylsilicon. Suitable derivatives of the above type AA compounds, such as salts of acids, also can be employed in the preparation of the polyquinoline materials provided in accordance with this invention. It is to be understood that each of the above-listed amino carbonyl compounds, or an amino carbonyl compound of the general formulas (1) and (2), may be substituted in place of the specific amino carbonyl shown in the examples given later, with satisfactory results.

The Ar substituent of the general formulas (1) and (2) for the type AA compounds can be any aromatic nucleus in which the positions of attachment of each set of carbonyl and amino functions are ortho, including a single aromatic nucleus and a polycyclic aromatic nucleus. In exemplary embodiments of type AA compounds provided in accordance with practice of this invention, the substituent Ar may be represented by the following groups:

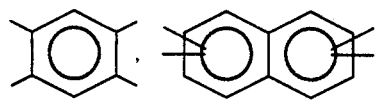

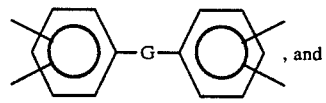, and

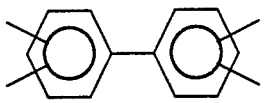

When the R substituent of the type AA compounds defined by the general formula (1) is aryl, it is most commonly phenyl (Ph).

In exemplary embodiments of the type AA compounds provided in accordance with practice of this invention, the substituent Ar' in the general formula (2) for the type AA compounds may be represented by the following group:

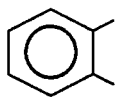

In exemplary embodiments of the type AA compounds provided in accordance with practice of this invention, the substituent Ar" in the general formula (2) may be represented by the following groups:

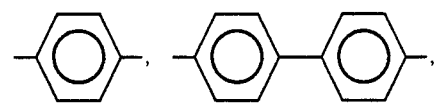

Within the above definition of the substituent G, the most common members are alkylene groups containing from 1 to 12 carbon atoms, arylene groups containing from 6 to 12 carbons, aralkylene groups containing from 7 to 14 carbons, alkarylene groups containing from 7 to 10 carbons, O, S, SO, $SO_2$, dialkylsilicon groups containing 1 to 5 carbons per alkyl group, and diarylsilicon groups containing 6 carbons per aryl group. The above definition of the substituent G includes cardo groups, non-limiting examples of which are represented by the following formulas:

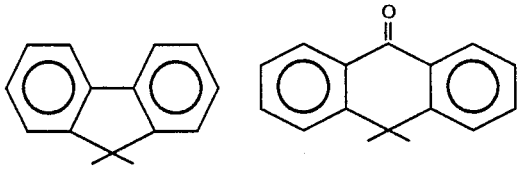

As defined above, type BB compounds are methylene ketones containing two ketone functions having a methylene group adjacent to each ketone. The type BB compounds provided in accordance with practice of this invention and represented by the general formulas (3) through (7) include rigid-rod type BB compounds and non-rigid-rod type BB compounds. Examples of rigid-rod and non-rigid-rod type BB compounds are as follows:

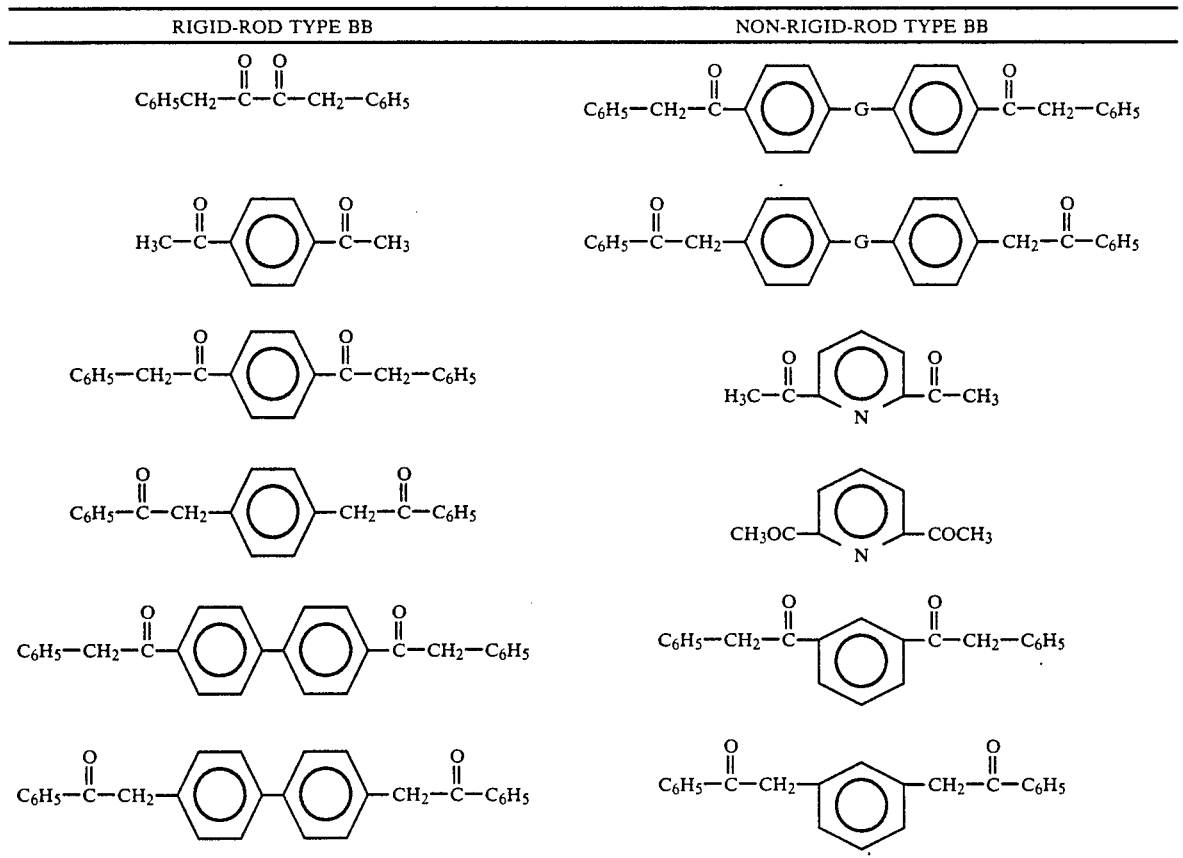

-continued
| RIGID-ROD TYPE BB | NON-RIGID-ROD TYPE BB |
|---|---|
| 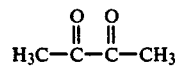 | 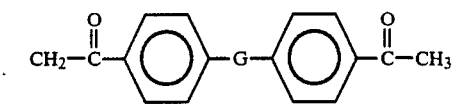 |
|  | 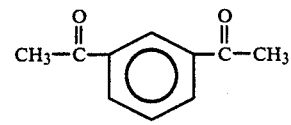 |
| 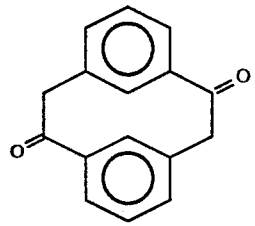 | 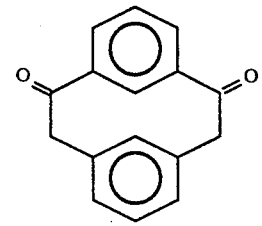 |
| 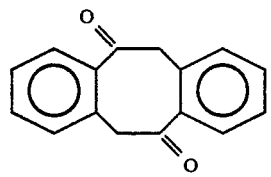 | 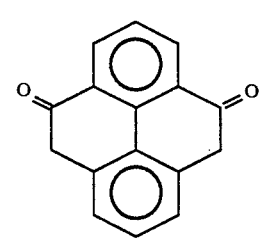 |
| 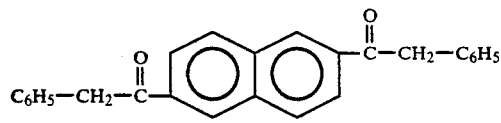 | 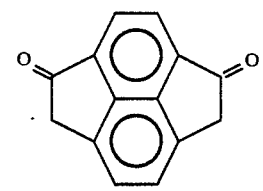 |
| 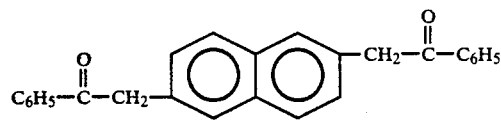 | 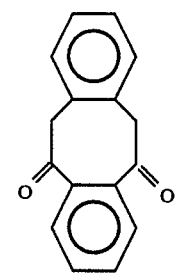 |
| 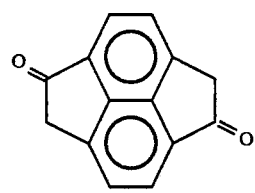 | |

| RIGID-ROD TYPE BB | NON-RIGID-ROD TYPE BB |
|---|---|
| 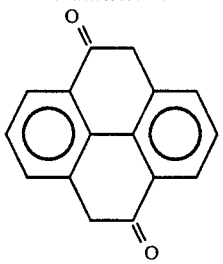 | |
| 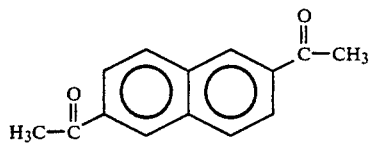 | |
| 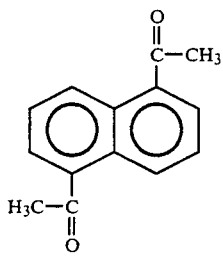 | |
| 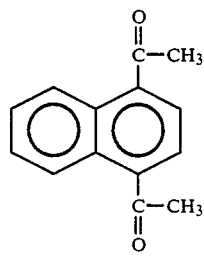 | |

The Ar" of the type BB compounds is the same as the Ar" of the type AA compounds and, as is apparent from the foregoing description of the type BB compounds, Ar" may be represented by the following groups:

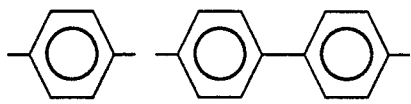

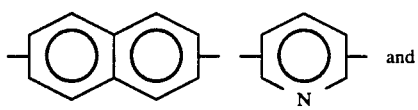

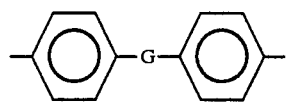

When the substituent R' or R of the type BB compounds is aryl, it is most often phenyl (Ph).

The substituent Ar'" of the type BB compounds is a tetra-functional aromatic nucleus and may be two bi-functional aromatic nuclei not already joined together or a single tetra-functional nucleus, e.g., a fused ring structure or bicyclic structure already joined some way, viz:

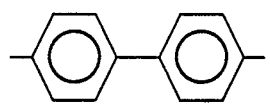

The symbol G is as defined above for type AA compounds and represents a divalent group selected from the group consisting of alkylene, arylene, aralkylene, alkarylene, oxygen, sulfur, sulfoxide, sulfone, dialkylsilicon and diarylsilicon.

It is to be understood that each of the above type BB compounds, i.e., the bis methylene ketones of the general formulas (3) through (7), may be substituted in place of the specific type BB compounds shown in the examples given later, with satisfactory results.

As defined above, the type AB compounds provided in accordance with this invention are aromatic compounds containing one set of ortho-amino carbonyl functions as well as one methylene ketone function attached to an aromatic nucleus. The type AB compounds useful in practice of this invention are represented by the general formulas (8) through (11) and include rigid-rod type AB compounds and non-rigidrod type AB compounds. Examples of rigid-rod and non-rigid-rod type AB compounds are as follows:

nucleus including a single aromatic ring and a polycyclic aromatic nucleus. The substituent Ar'''' provided in

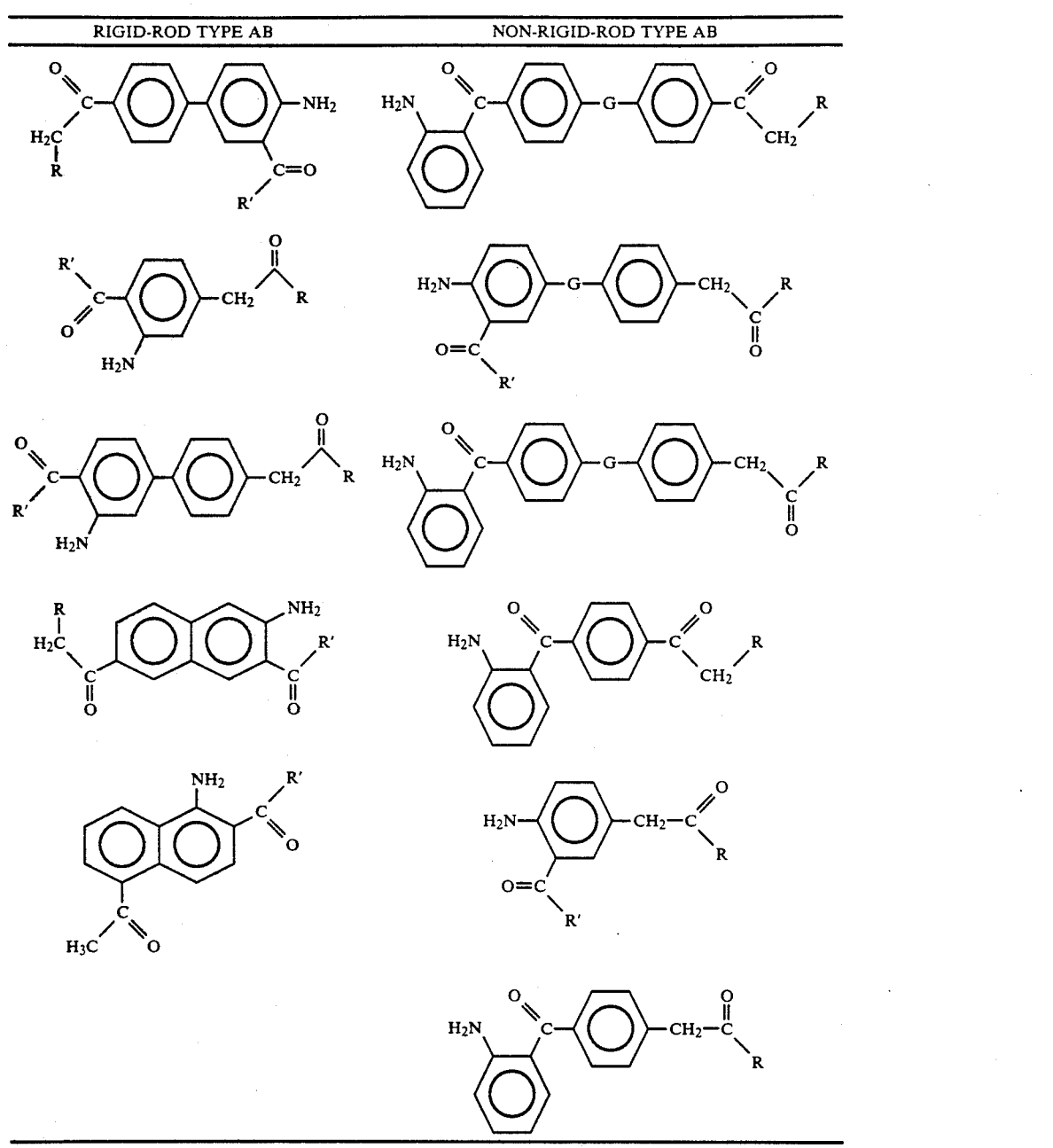

The symbol G is as defined above for type AA compounds and represents a divalent group selected from the group consisting of akylene, arylene, aralkylene, alkarylene, oxygen, sulfur, sulfoxide, sulfone, dialkylsilicon and diarylsilicon.

Suitable derivatives of the above type AB compounds, such as salts of acids, also can be employed in the preparation of polyquinoline copolymers and mixtures of the present invention. It is to be understood that each of the above type AB compounds or an AB compound of any one of the general formulas (8) through (11) can be substituted in place of the specific AB compound shown in the examples given later, with satisfactory results.

The substituent Ar'''' in the general formulas (8) and (9) for the type AB compounds can be any aromatic accordance with practice of this invention may be represented by the following groups:

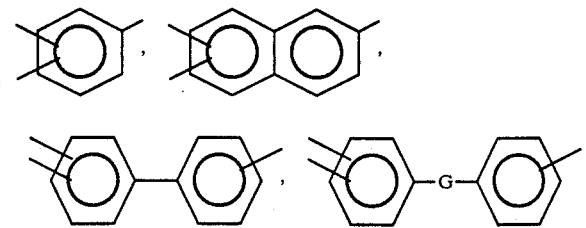

When the substituent R or R' of the AB compounds is aryl, it most often is phenyl (Ph).

In exemplary embodiments of the type AB compounds provided in accordance with practice of this invention, the substituent Ar' may be represented by the group:

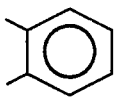

In exemplary embodiments of the type AB compounds provided in accordance with practice of this invention, the substituent Ar' may be represented by the following groups:

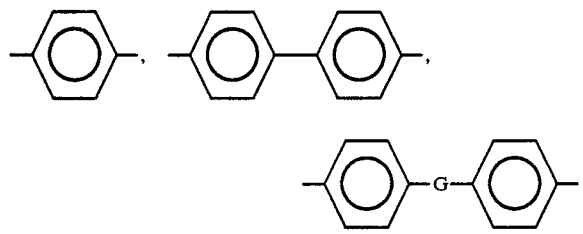

All of the polyquinoline polymers of the present invention are produced by allowing mixtures of various combinations of type AA, type BB, and type AB compounds to react in the presence of either an acid or a base catalyst in a suitable solvent, i.e., the polymerizations are all done in solution. Thus, when it is described herein that mixtures of various combinations of type AA, type BB and type AB compounds react together, it is understood that the reacting compounds are in a solution containing an appropriate solvent and catalyst. In general, the solvents and catalysts used, the reaction times and temperatures, and the methods of isolating the new polyquinoline copolymers are analogous to the methods employed for preparing polyquinoline homopolymers disclosed in U.S. Pat. No. 4,000,187, and in Stille, J. K., Macromolecules, 1981, 14, 870–880, which is incorporated herein by this reference. In contrast to the previous work, however, the present invention resides in one or more of the following (a) in the use of special combinations and selections of type AA, type BB, and type AB compounds; (b) in the use of carefully controlled amounts of each of the polyquinoline precursor compounds selected; (c) in adding particular type AA, type BB, and type AB compounds to the reaction mixture in carefully prescribed order and at controlled times during the reaction to produce any particular polyquinoline polymer; and (d) in individually preparing two or more different polyquinoline polymers, then combining them into a mixture. Thus, the methods of the present invention are critical to successful preparation of the new polyquinoline polymers.

The aromatic amino carbonyl compounds, i.e., the type AA compounds, suitable for processes of the present invention can be prepared in a variety of ways but are often prepared by combinations of organic reactions, including acylations, oxidations, and reductions. The synthesis of 4,6-diaminoisophthalaldehyde is described in P. Ruggli and P. Hindemann, Helv. Chim. Acta., 20, 272 (1937), of 2,5-diaminoterephthalaldehyde in P. Ruggli and F. Brandt, Helv. Chim Acta. 7, 274 (1944), of 4,6-dibenzoyl-m-phenylenediamine in L. Chardonnes and R. Ritter, Helv. Chim. Acta., 38, 393 (1955), of 2,5-dibenzoyl-p-phenylenediamine in D. A. Kinsey and S. G. P. Plant, J. Chem. Soc., 1 (1958), and of 2,2'-diaminoisophthalopheneone in J. C. E. Simpson, C. M. Atkinson, C. Schofield and O. Stephenson, J. Chem. Soc., 646 (1945).

The Friedel-Crafts reaction of a phthalic anhydride derivative followed by conversion of the remaining carboxylic acid function to an amine via a Hofmann degradation of the amide is a route to two amino ketone monomer compounds of the type AA provided in accordance with practice of this invention. The Friedel-Crafts reaction of pyromellitic dianhydride with benzene gives approximately equimolar amounts of the two isomeric dibenzoylphthalic acids that can be separated on the basis of their solubilities. Conversion of the acids to the pseudodibenzoylphthaloyl chlorides followed by the reaction with ammonia gives the corresponding amides which are smoothly converted to the amine by a Hofmann reaction with sodium hypochlorite.

An analogous synthetic procedure has been carried out starting from phthalic anhydride and diphenyl ether, the resulting bis(carboxybenzoyl) diphenyl ether being converted to the corresponding amide.

The generation of benzisoxazole from an aromatic nitro compound followed by reductive cleavage of the benzisoxazole has proven to be the most versatile and generally useful method of o-amino ketone synthesis. The reaction of 4,4'-dinitrodiphenyl ether with phenylacetonitrile in the presence of base yields a bis-benzisoxazole that can be converted to the amino ketone by hydrogenation with a palladium catalyst. This catalyst does not reduce the aryl ketone. A benzisoxazole has been obtained from p-bromonitrobenzene. Reduction of the benzisoxazole ring was carried out chemically to avoid removal of the bromide function. Coupling of the 2-benzoyl-4-bromoaniline was then accomplished with nickel.

The methylene ketone compounds, i.e., the type BB compounds, suitable for processes of the present invention can be prepared in a variety of ways but are often conveniently prepared by Friedel-Crafts reactions of acid chlorides on aromatic nuclei. The synthesis of 1,4-diphenylacylbenzene is described in C. L. Schilling, Jr., J. A. Reed and J. K. Stille, Macromolecules, 2, 85 (1969), of 1,4-diphenacetylbenzene in M. A. Ogliaruso and E. I. Becker, J. Org. Chem., 30, 3554 (1965), of 4,4'-diphenacetylphenyl ether, 4,4'-diphenylacetylphenyl sulfide and 4,4'-diphenacetylbiphenyl in H. A. Ogliaruso, L. A. Shadov, and E. I. Becker, J. Org. Chem., 28, 2725 (1963), of p-diacetylbenzene in L. Berend and P. Herms, J. Prakt. Chem., 74, 134 (1906), of 1,3-diacetylbenzene in J. Bowman, J. Chem. Soc., 323 (1950), of 4,4'-diacetylphenyl ether in H. Kipper, Chem. Ber., 38, 2491 (1905), of 2,6-diacetylpyridine in A. P. Terentev, E. G. Rukhadze, I. G. Mochalina, and V. V. Rode, Zh. Vses. Khim. Obshch. im. D.I. Mendeleeva, 6, 116 (1961), of 4,4'-diacetyldiphenylsulfide in C. M. Smith, U.S. Pat. No. 2,903,461 (1959), of 4,4'-diacetyldiphenylsulfone in P. F. Hu, J. Chem. Soc., 178 (1959), of 4,4'-diacetylbiphenyl in H. Tani, F. Toda and K. Matsumiya, Bull. Chem. Soc. Jap., 36, 391 (1963), of dibenzo[a,e]-cyclooctene-5,11-(6H,12H)dione in P. Yates, E. G. Lewars and P. H. McCabe, Can. J. Chem., 48, 788 (1970), and of 1,10-diketo[2.2]metacyclophane in T. Hylton and V. Boekelheide, J. Amer. Chem. Soc., 90, 6887 (1968).

The Friedel-Crafts acylation or phenacylation of certain aromatics is a suitable method of obtaining pure bis(ketomethylene) (type BB) compounds in high yields. This method is particularly useful for the acylation of biphenyl, diphenyl ether, and diphenyl sulfide. The coupling reaction of an acyl aromatic compound can be an effective method of producing a bisacetyl monomer. The reaction of a Grignard reagent with a dinitrile also has been utilized for the synthesis of bis(ketomethylene) compounds, particularly for bis(deoxybenzoins).

The synthesis of type AB compounds suitable for processes of the present invention can, for example, be prepared by benzisoxazole synthesis described in Eichinger, B. E., Flory, P. J., *Trans. Faraday Soc.*, 1968, 64, 2035, 2053, 2061 and 2066, and Kwei, T. K., Patterson, G. D., Wang, T. T., *Macromolecules,* 1976, 9, 780. Protection of the acetyl groups was necessary since the reaction of the nitro aromatic with the phenylacetonitrile is carried out with strong base. Hydrogenation of the benzisoxazole ring was then followed by removal of the ketone protecting group.

Preparation of various AA, BB and AB compounds is set forth in Stille, J. K., *Macromolecules,* 1981, 14, 870–880. The complete disclosures of the above articles which relate to the methods for preparation of the type AA, type BB and type AB compounds are incorporated herein by reference.

In one embodiment of the present invention, polyquinoline copolymers are prepared. A polyquinoline copolymer is defined herein as any particular polyquinoline polymer which results from the reaction of mixtures of various combinations of type AA, type BB, and type AB compounds, except for those polyquinoline homopolymers which are produced from reaction of a single type AA compound with a single type BB compound, or from reaction of a single type AB compound. As an illustrative example, a polyquinoline copolymer can be represented schematically as:

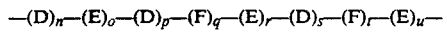

wherein D, E, and F represent individual different monomer units, the number of which can vary from 2 to 100, but most often from 2 to 10. The subscripts n, o, p, q, r, s, t, and u, indicate the number of recurring monomer units in each segment of the polymer, which number can vary from 1 to 100,000, and most usually from 1 to 1,000. It is understood that the number of recurring monomer units in each segment may be the same, or may vary from segment to segment, regardless of the nature of the monomer unit in any segment. It is obvious that for the special case of polyquinoline homopolymers, there is only a single monomer unit, D in the representation:

According to the present invention, the method for producing polyquinoline copolymers entails allowing a mixture of a combination of type AA, type BB, and type AB compounds to react together in solution. Such mixture combinations include the following: (1) one or more type AA compounds, one or more type BB compounds and one or more type AB compounds; or (2) one or more type AA compounds and one or more type BB compounds where the total number of different types of AA and BB compounds is greater than three; or (3) two or more type AB compounds. These combinations are referred to herein as the "No. (1), No. (2) and No. (3) mixture combinations," respectively. The minimum amount of each such AA, BB, or AB precursor compound used in such a mixture is at least 0.01%, but preferably 0.1%, and most preferably 1.0%, of the total number of moles of precursor compounds, i.e., the type AA, type BB, and type AB compounds, selected. For any particular polyquinoline copolymer, the product is considered to be a rigid-rod polyquinoline copolymer if a minimum of 99.0 mole percent of the total of all of the type AA, type BB, and type AB compounds used are chosen from the group of rigid-rod precursor compounds.

Random Copolymers

According to the present invention, the polyquinoline copolymers provided are prepared according to a method referred to herein as the "general method" for producing polyquinoline copolymers. The general method of this invention is as follows: the selected type AA, type BB, and type AB precursor compounds are combined with an appropriate acid or base catalyst, in an appropriate solvent or mixture of solvents (referred to herein as the "first solvent system"), and the entire reaction mixture is heated between 25° and 250° C. until the reaction is complete Most often, the reaction is commenced at ambient temperature, and the temperature is raised slowly to about 135° C. and then maintained at that temperature with vigorous stirring, until the reaction is complete or until the desired average molecular weight is achieved.

The acid and base catalysts and the solvents useful in practice of the process of this invention are set forth in U.S. Pat. No. 4,000,187, which is incorporated herein by reference. For example, the acid catalysts can be either protonic or Lewis acids. Hydrogen halides (fluoride, chloride, bromide or iodide), sulfuric acid, a sulfonic acid, e.g., as toluenesulfonic acid, phosphoric acid, polyphosphoric acid, trifluoroacetic acid, monoaryl phosphates, diaryl phosphates, etc., are examples of protonic acid catalysts, while boron fluoride, phosphorous pentafluoride, aluminum chloride, antimony trifluoride, antimony pentafluoride, antimony trichloride, stannic chloride, etc., are examples of Lewis acid catalysts. The base catalysts can be either hydroxylic or Lewis bases. Sodium hydroxide, potassium hydroxide, calcium hydroxide, lithium hydroxide, etc., are examples of hydroxylic base catalysts, while N-ethyl morpholine, triethyl amine, 1,5-diazabicyclo[4.3.0]non-5-ene, 1,4-diazabicyclo[2,2,2]octane, etc., are examples of Lewis base catalysts.

A wide variety of solvents are available for either the acid or the base catalyzed reaction The solvent employed for these reactions should not react under the reaction conditions with either the acid or the base catalyst or with any of the functional groups on the monomers, such that this reaction would have an adverse effect on the polymerization reaction. Benzene, chlorobenzene, 1-chloronaphthalene, tetralin, acetic acid, formic acid, phenols, e.g., m-cresol, o-, m- and p-dichlorobenzene (or mixtures thereof), polyphosphoric acid, etc., are solvents which can be used in the acid catalyzed reactions. In certain cases, such as those of formic and acetic acids, it is desirable to add a strong acid catalyst since formic and acetic acids are not strong enough at the reaction temperatures to produce sufficient catalysis and reaction speed in order that the high molecular weight polymer will be produced within convenient reaction times. Dimethylsulfoxide, hexamethylphosphorictriamide, dimethylformamide, tetrahydrothiophene dioxide, dimethylacetamide, N-methylpyrrolidone, etc., are solvents which can be used in the base catalyzed reaction.

The completeness of the reaction can be determined by a number of methods, including by monitoring either the duration of the reaction or the viscosity of the reaction mixture. Upon cooling to ambient temperature, the reaction mixture is poured into a second solvent or mixture of solvents (referred to herein as the "second solvent system") to precipitate the product polyquinoline copolymer. Most often, the second solvent system consists of ethanol and triethylamine. However, the second solvent system can be any solvent or mixture of solvents which is not a good solvent system for the particular product polyquinoline copolymer, such as, but not limited to, water, methanol, 2-propanol, 1-butanol, 2-butanol, etc. When an acid catalyst or solvent is used in the initial reaction, the second solvent system also may include a base to partly or fully neutralize the acid solvent or any acid catalyst in the reaction mixture, such base to include, for example, triethylamine, trimethylamine, pyridine, sodium hydroxide, sodium carbonate, sodium bicarbonate, potassium hydroxide, potassium bicarbonate, etc.

It is obvious that selection of certain special mixtures of type AA, type BB, and type AB compounds are used to produce polyquinoline homopolymers. Thus, the reaction of any single type AB compound, or, separately, the reaction of any single type AA compound with any single type BB compound, results in the production of polyquinoline homopolymers, as is described in U.S. Pat. No. 4,000,187.

First Random Copolymer Method

In one embodiment of the present invention, certain polyquinoline copolymers are produced by the reaction of any mixture containing one or more type AA compounds, one or more type BB compounds, and one or more type AB compounds (a No. (1) mixture combination). Any particular polyquinoline copolymer produced from such a mixture of precursor compounds is considered to be a random copolymer and is produced according to the general methods for producing and isolating polyquinoline copolymers described above.

Second Random Copolymer Method

In another embodiment of the present invention, certain polyquinoline copolymers are produced by the reaction of any mixture containing only type AA and type BB compounds but in which the total number of type AA and type BB compounds is three or greater (a No. (2) mixture combination). Any particular polyquinoline copolymer produced from such a mixture of precursor compounds is considered to be a random copolymer and is produced according to the general methods for producing and isolating polyquinoline copolymers described above.

Third Random Copolymer Method

In another embodiment of the present invention, certain polyquinoline copolymers are produced by the reaction of any mixture containing only type AB compounds but in which the total number of type AB compounds is two or greater (a No. (3) mixture combination). Any particular polyquinoline copolymer produced from such a mixture of precursor compounds is considered to be a random copolymer, and is produced according to the general methods for producing and isolating polyquinoline copolymers described above.

It should be noted that polyquinoline copolymers have chemical and physical properties different from polyquinoline homopolymers, and that the properties of certain polyquinoline copolymers can result in useful applications. As an illustrative example, films of the homopolymer produced by allowing equimolar amounts of the following type AA and type BB compounds to react, produces a homopolymer referred to herein as homopolymer (1).

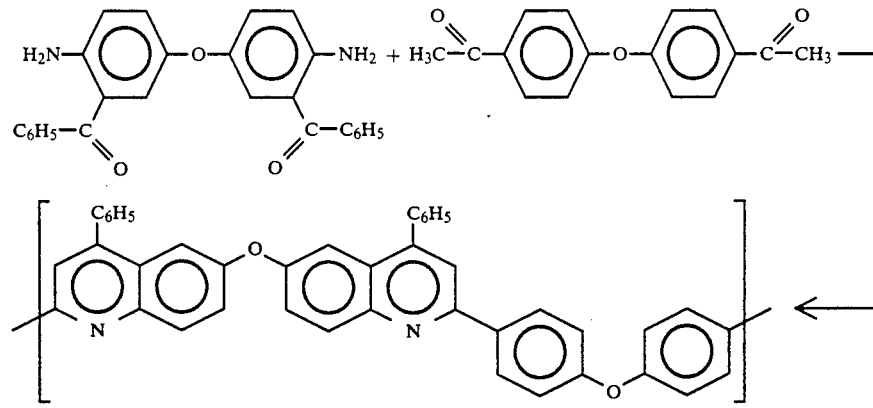

[Homopolymer (1)]

When homopolymer (1) was examined by differential mechanical analysis, it exhibited a single tan $\delta$ with $T_{max}$ at 275° C. Tan $\delta$ is defined as tan $\delta = E_2/E_1$, wherein $E_1$ is the dynamic modulus in phase with the strain, and $E_2$ is the dynamic modulus which is $\pi/2$ out of phase with the strain. Similarly, films of the homopolymer produced by allowing equimolar amounts of the following two type AA and type BB compounds to react, produces a homopolymer referred to herein as homopolymer (2).

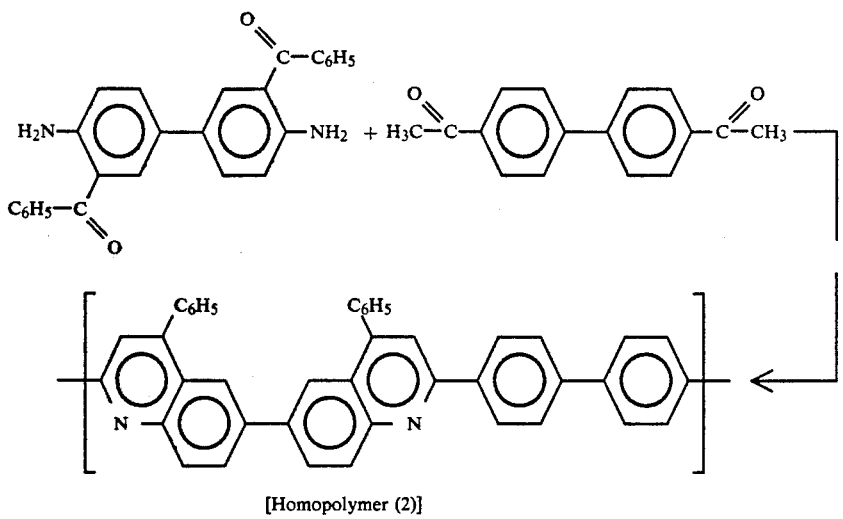

[Homopolymer (2)]

When homopolymer (2) was examined, it exhibited a single tan δ with $T_{max}$ at 370° C. In contrast to the two homopolymers, films of the polyquinoline copolymer produced by allowing equimolar amounts of all four of the above type AA and type BB compounds to react, exhibited a single tan δ with $T_{max}$ at 316° C. Thus, the copolymer exhibits properties distinctly different from those of either of the homopolymers (1) or (2).

Block Copolymers

Another embodiment of the present invention resides in the preparation of polyquinoline block copolymers. A polyquinoline block copolymer is defined as a polymer containing two or more segments, referred to herein as "blocks," of different polyquinoline oligomers, covalently joined together. In contrast to polyquinoline random copolymers, polyquinoline block copolymers are produced in such a way as to achieve a certain amount of control over the average number of recurring monomer units in each different type of block in the block copolymer. Any particular block may be a homo-oligomer, resulting from the reaction of a single type AA compound with a single type BB compound or from reaction of a single type AB compound and consisting of 2 to 10,000 recurring polyquinoline monomer units, and most often consisting of an average of 5 to 1,000 recurring monomer units. Alternatively, any particular block may be a co-oligomer consisting of a segment of a polyquinoline copolymer prepared from mixtures of type AA, type BB, and type AB compounds described above as the No. (1), No. (2), and No. (3) mixture combinations for preparing random copolymers Such co-oligomers have an average molecular weight of from about 254 to 250,000 Daltons, and most often have an average molecular weight of from about 1,000 to 100,000 Daltons. It is understood that any particular block may be a rigid-rod oligomer or a non-rigid-rod oligomer, depending on the choice of type AA, type BB, and type AB monomers selected for the mixture combination used. Thus, any particular polyquinoline block copolymer may contain only rigid-rod blocks, or only non-rigid-rod blocks, or a combination of both.

It will be appreciated that successful production of a block copolymer requires a polymer-forming reaction and subsequent block chemical inertness that does not result in scrambling among the block segments, i.e., if a particular multi-block polymer is formed, then each block must be inert to any intermolecular or intramolecular reactions which could lead to block fission and subsequent interblock fusion. As an illustrative example, it is well known that esters are subject to trans esterification. Extraordinary care must be employed in any attempt to produce polyester block copolymers or else the objective block copolymer will be transformed into a random copolymer. In contrast, polyquinoline block copolymers produced according to the methods of the present invention are essentially inert to any such interblock scrambling.

According to the present invention, the general method for producing polyquinoline block copolymers is a multi-step process. In the first step, an initial mixture of precursor compounds in solution with an appropriate solvent or mixture of solvents and a catalyst is used to produce the first block, having a controlled average molecular weight and with reactive groups at each end of the block. In the second step, additional precursor compounds are added in a second mixture of precursor compounds, some of which react with the reactive groups at the end of the first block, resulting in multi-block polymers. According to the methods of the present invention, in the first step the initial mixture of precursor compounds is allowed to react under conditions analogous to those described above for the general method for producing polyquinoline random copolymers, except that the initial product, the first block, is not precipitated from the reaction mixture. Rather, in the second step of the reaction, upon reaching the desired degree of reaction completion of the initial mixture of precursor compounds, a second mixture of polyquinoline precursor compounds is added, which second mixture contains different types of or different relative amounts of precursor compounds than was contained in the first mixture used in the first step, and the reaction is allowed to continue. Again, the reaction can be monitored by any convenient method. Upon reaching the desired degree of completion of the second step, the reaction can be terminated, and the product polyquinoline block copolymer isolated by precipitating the product in a fashion analogous to that described above for the preparation of polyquinoline copolymers. Any particular polyquinoline block copolymer prepared according to this two-step method will contain two different blocks. Alternatively, at the end of the second step, before precipitating the reaction product, a third and even subsequent steps may be used, each analogous to the second step, to add additional, different types of blocks, but usually the number of blocks will be from two to four. This method can be used for producing polyquinoline block copolymers having only rigid-rod blocks, only non-rigid-rod segments, or both types of segments.

First Block Copolymer Method

In one embodiment of the method for producing block copolymers of the present invention, the average molecular weights of the blocks comprising such polyquinoline block copolymers is controlled by choice of the specific reaction conditions, and by choice of the relative amounts of precursor compounds for each block. Thus, block copolymers are produced in a two-step process.

In the first step of the two-step process, an initial mixture, i.e., a first block-forming mixture comprising a No. (1), a No. (2), or a No. (3) mixture combination, of type AA compounds, type BB compounds, and type AB compounds is in solution of an appropriate solvent and catalyst. When both type AA and BB compounds are in the mixture, the total number of moles of type AA compounds is equal to the total number of moles of type BB compounds. The mixture is allowed to react under reaction conditions analogous to those described above for the general method for producing polyquinoline random copolymers. The reaction is monitored by timing the reaction, by monitoring the viscosity of the reaction, or by using any other convenient method to determine when the reaction has proceeded sufficiently to yield polyquinoline segments of the desired average molecular weight. In the production of any particular polyquinoline block copolymer, it will be obvious that a relatively short reaction time at lower temperatures will result in a relatively low average molecular weight for the first block, while allowing the reaction to continue for a longer period of time or at a higher temperature will result in the first block having a somewhat higher average molecular weight.

In the second step of the two-step process, a second mixture, i.e., a second block-forming mixture comprising a No. (1), a No. (2), or a No. (3) mixture combination, of type AA compounds, type BB compounds, and type AB compounds is in solution of an appropriate solvent and catalyst. When both type AA and BB compounds are in the mixture, the total number of moles of type AA compounds is equal to the total number of moles of type BB compounds, and the second block-forming mixture contains different types and/or relative amounts of precursor compounds than were contained in the first block-forming mixture. The second mixture is added to the reacted first block-forming mixture, and the reaction allowed to continue until the reaction is complete. According to this method, the average molecular weight of the second block will be determined in part by the total number of moles of precursor compounds in the second block-forming mixture versus the total number of moles of precursor compounds in the first block-forming mixture, the average molecular weight of the block produced in the first step, and the degree of completion of the reaction when the polyquinoline block copolymer is precipitated from solution. After completion of the second step, the product polyquinoline block copolymer can be isolated by precipitation, as described earlier. Alternatively, the reaction sequence can be continued, with third and even subsequent steps, to add additional, different blocks to the polyquinoline block copolymer before terminating the reaction and isolating the product. This method can be used for producing polyquinoline block copolymers having only rigid-rod blocks, only non-rigid-rod segments, or both types of segments.

It will be recognized that, in the aforementioned first method of producing polyquinoline block copolymers, it is difficult to control the average molecular weight of the constituent blocks since the method relies upon interrupting the first step reaction when the reaction is only partly completed.

Second Block Copolymer Method

Another embodiment of the present invention relates to a method for controlling the average molecular weights of blocks, wherein the relative amounts of type AA and type BB compounds used in the first step to prepare the initial block are dissimilar, and the initial reaction is allowed to continue to completion. Upon completion of the first step reaction, the reaction mixture contains polyquinoline oligomers of known average molecular weight with reactive end groups ready for subsequent reaction when the second mixture of precursor compounds is added during the second step. According to this method, in the first step, an initial mixture, i.e., the first block-forming mixture comprising a No. (1) or a No. (2) mixture combination, comprising one or more type AA compounds, one or more type BB compounds, and zero, one, or more type AB compounds, is prepared. The total number of moles of type AA compounds in the first mixture is not equal to the total number of moles of type BB compounds. The first mixture is allowed to react under reaction conditions analogous to those described above for production of polyquinoline random copolymers. The reaction is continued to completion.

In the production of any particular polyquinoline block copolymer by the second block copolymer method, the highest average molecular weights for the initial block will be achieved by using a molar ratio of type AA to type BB compounds which is close to, but not equal to, 1.0. The number of reactive end groups in the initial blocks produced can be calculated from the molar ratio of type AA to type BB compounds using the modified Carothers equation:

$$DP = \frac{1 + r}{1 + r - 2rP}$$

wherein DP is the degree of polymerization, r is the mole ratio of the two types of monomers taken such that r is less than or equal to 1, and P is the extent of reaction:

$$P + \frac{\text{Number of Groups that have Reacted}}{\text{Number of Groups Present Initially}}$$

In the second step, a second mixture, i.e., the second block-forming mixture comprising a No. (1), a No. (2), or a No. (3) mixture combination, of type AA, type BB, and type AB compounds, is prepared. The second block-forming mixture contains different types or different relative amounts of precursor compounds than were contained in the first block-forming mixture. The second block-forming mixture is added to the reaction mixture, and the reaction is allowed to continue until the reaction is complete. According to this method, when either a No. (1) or a No. (2) mixture combination is used in both the first and second steps, the maximum molecular weight of the second block and of the polyquinoline block copolymer will be obtained when the total number of moles of type AA compounds used in both the first and second steps is equal to the total number of moles of type BB compounds used in both the first and second steps. After completion of the second step, the product polyquinoline block copolymer can be isolated by precipitation, as described earlier. Alternatively, the reaction sequence can be continued in an analogous fashion, with third and even subsequent steps, to add additional, different blocks to the polyquinoline block copolymer before terminating the reaction and isolating the product. It is understood that this method can be used for producing polyquinoline block copolymers having only rigid-rod blocks, only non-rigid-rod segments, or both types of segments.

Third Block Copolymer Method

Another embodiment of the present invention relates to a method for controlling the average molecular weights of blocks, wherein only type AA or only type BB compounds are used in the first step, along with type AB compounds, to prepare the initial block, and the initial reaction is allowed to continue to completion. Upon completion of the first step reaction, the reaction mixture contains polyquinoline oligomers of known average molecular weight, with reactive end groups ready for subsequent reaction when the second mixture of precursor compounds is added during the second step. According to this method, in the first step, an initial mixture of one or more type AA compounds, or of one or more type BB compounds, as well as one or more type AB compounds is allowed to react under reaction conditions analogous to those described above for production of polyquinoline random copolymers. The reaction is continued to completion.

In the production of any particular polyquinoline block copolymer, the highest average molecular weights for the initial block will be achieved by using a molar ratio of type AB to type AA compounds, or of type AB to type BB compounds, which is large. The number of reactive end groups in the initial blocks produced can be calculated from the molar ratio using the above-described modified Carothers equation. It should be noted that if type AA compounds are used in the first step, then the reactive end groups will consist of orthoamino carbonyl functions, while, if type BB compounds are used in the first step, then the reactive end groups will consist of methylene ketone functions. In the second step, a second mixture, i.e., a second block-forming mixture comprising a No. (1), a No. (2), or a No. (3) mixture combination of type AA, type BB, or type AB compounds, is prepared. In the second block-forming mixture, the total number of type BB compounds and of type AB compounds is one or greater if type AA compounds are used in the first mixture, and the total number of type AA compounds and of type AB compounds is one or greater if type BB compounds were used in the first mixture. The second mixture also contains different types or different relative amounts of precursor compounds than were contained in the first mixture. The second mixture is then added to the reacted first mixture, and the reaction is allowed to continue until complete.

According to this method, the maximum molecular weight of the second block and of the polyquinoline block copolymer will be obtained when the total number of moles of type AA compounds used in both the first and second steps is equal to the total number of moles of type BB compounds used in both the first and second steps. After completion of the second step, the product polyquinoline block copolymer can be isolated by precipitation, as described earlier. Alternatively, the reaction sequence can be continued, with third and even subsequent steps, to add additional, different blocks to the polyquinoline block copolymer, as described above, before terminating the reaction and isolating the product. It is understood that this method can be used for producing polyquinoline block copolymers having only rigid-rod blocks, only non-rigid-rod segments, or both types of segments.

Tri-Block Copolymers

Another embodiment of the present invention resides in the preparation of polyquinoline tri-block copolymers. A polyquinoline tri-block copolymer is defined as a polymer containing three segments but in which two of the segments are of similar or identical type but not necessarily length. Thus, polyquinoline tri-block copolymers consist of one segment of one type of block in the middle section of any given polymer chain, with two segments of a different type of block covalently attached to each end of the first block. The middle block produced in any particular polyquinoline tri-block copolymer may be a homo-oligomer, resulting from the reaction of a single type AA compound with a single type BB compound and consisting of 2 to 10,000 recurring polyquinoline monomer units, and most often consisting of an average of 5 to 1000 recurring monomer units. Alternatively, the middle block may be a co-oligomer consisting of a segment of a polyquinoline copolymer prepared from mixtures of type AA and type BB compounds, with an average molecular weight of 254 to 250,000 Daltons, and most often with an average molecular weight of 1,000 to 100,000 Daltons. Similarly, the end blocks in any particular polyquinoline tri-block polymer may be a homo-oligomer produced using a single type AB compound or a co-oligomer produced using a mixture of two or more type AB compounds.

It is understood that any particular block may be a rigid-rod oligomer or a non-rigid-rod oligomer, depending on the choice of type AA, type BB, and type AB monomers selected. Thus, any particular polyquinoline tri-block copolymer may contain only rigid-rod blocks, or only non-rigid-rod blocks, or a combination of both. As an illustrative example, a particular polyquinoline tri-block copolymer may have a single rigid-rod block with two non-rigid-rod blocks, one covalently attached to each end of the rigid-rod block. Alternatively, a particular polyquinoline tri-block copolymer may have a single non-rigid-rod block with two rigid-rod blocks, one covalently attached to each end of the non-rigid-rod block.

According to the methods of the present invention, polyquinoline tri-block copolymers are prepared in a two-step process. In the first step, one or more type AA compounds, one or more type BB compounds, and zero, one, or more type AB compounds, wherein the number of moles of type AA compounds is not equal to the number of moles of type BB compounds, are allowed to react to completion under reaction conditions analogous to those described for the general method for producing polyquinoline random copolymers. After the first reaction is completed, one or more type AB compounds is added to the reaction mixture, and the reaction is allowed to continue to completion. The product polyquinoline tri-block copolymer then is isolated by precipitation, as described in the method for producing polyquinoline copolymers. It is understood that use of rigid-rod type AA, rigid-rod type BB, and rigid-rod type AB compounds in the first step, but non-rigid-rod type compounds in the second step, will result in a tri-block polyquinoline copolymer having one rigid-rod block with two non-rigid-rod blocks, one covalently attached to each end of the rigid-rod block. It also is understood that use of non-rigid-rod type AA, non-rigid-rod type BB, and non-rigid-rod type AB compounds in the first step, but rigid-rod type AB compounds in the second step, will result in a tri-block polyquinoline copolymer having one non-rigid-rod block with two rigid-rod blocks, one covalently attached to each end of the non-rigid-rod block.

Polyquinoline Mixture Composition

In another embodiment, the present invention resides in a polyquinoline mixture composition consisting of a mixture of two or more different polyquinoline polymers, wherein the polyquinoline polymers are selected from the group of polyquinoline homopolymers, random copolymers, block copolymers, tri-block copolymers, or any other type of polyquinoline polymers. As the name implies, polyquinoline mixtures are obtained by mixing the polyquinoline polymers selected.

In one embodiment of the present invention, polyquinoline mixtures are prepared by first dissolving the polyquinoline polymers selected in a solvent or a mixture of solvents in which all of the polyquinoline polymers are sufficiently soluble. The total concentration of polymers in the resulting solution may vary from 0.01 weight percent to 50.0 weight percent, but usually from 1.0 to 25.0 weight percent. Subsequently, the solvent is evaporated to yield the product polyquinoline mixture. Alternatively, a second solvent or mixture of solvents is then added to the solution in such a fashion as to cause rapid precipitation of the polyquinoline mixture from the resulting mixture of solvents. It is understood that the second solvent or mixture of solvents employed must be a poor solvent for the constituent polyquinoline polymers and can include water, ethanol, methanol, propanols, butanols, pyridine, triethylamine, etc. It is understood that, according to this method, in the preparation of a particular polyquinoline mixture, the product mixture may contain more than one phase attributable to a certain amount of phase separation of the constituent polymers.

For preparing mixtures of polyquinoline homopolymers and/or copolymers, a universal solvent can be regarded as a mixture of 65:35 w/w % of m-cresol:di-m-cresyl phosphate. Other solvents are contemplated as being useful for preparing such polyquinoline mixtures, depending on the specific combination of polyquinoline homopolymers and/or copolymers used. For example, polyquinoline homopolymers or copolymers that contain only rigid-rod segments, or are predominantly comprised of rigid-rod segments, can be expected to be soluble in selected strong acids, such as trichloromethane sulfonic acid, and, thus, trichloromethane sulfonic acid can be expected to be a reasonable solvent for preparing mixtures of such predominantly rigid-rod polymers. In contrast, certain polyquinoline homopolymers and copolymers which are comprised totally of non-rigid-rod segments, or predominantly of non-rigid-rod segments, are soluble in certain organic solvents, such as chloroform, and, thus, chloroform can be expected to be a suitable solvent for preparing mixtures of certain such non-rigid-rod polyquinoline polymer mixtures.

Accordingly, in another embodiment of the present invention, polyquinoline mixtures are prepared by first dissolving the polyquinoline polymers selected in a solvent or a mixture of solvents in which all of the polyquinoline polymers are sufficiently soluble but in which solution the total concentration of polymers in the resulting solution ranges from a low of 0.01 weight percent, but usually from about 1.0 weight percent up to a concentration below the concentration at which the solution becomes anisotropic. A second solvent or mixture of solvents is then added to the solution in such a fashion as to cause rapid precipitation of the polyquinoline mixture from the resulting mixture of solvents. It is understood that the second solvent or mixture of solvents employed must be a poor solvent for the constituent polyquinoline polymers and can include water, ethanol, methanol, propanols, butanols, pyridine, triethylamine, etc. Alternatively, the polymer solution may be processed by spinning into a non-solvent to give fibers or by extrusion into a non-solvent, such as through a slit, to give films.

It should be noted that polyquinoline mixtures have chemical and physical properties different from single component polyquinoline homopolymers or copolymers, and that the properties of certain polyquinoline mixtures can result in useful applications. As an illustrative example, films of the polyquinoline homopolymer (1),

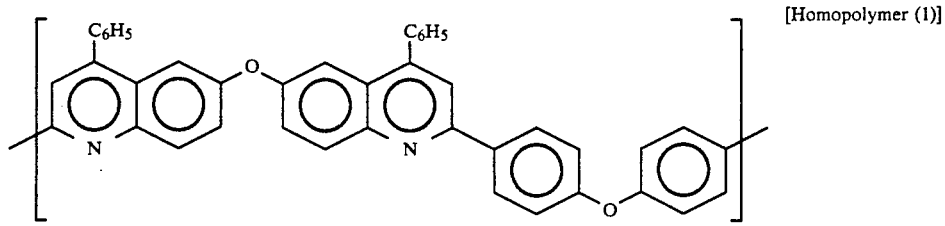

[Homopolymer (1)]

when examined by differential mechanical analysis, exhibited a single tan δ with $T_{max}$ at 276° C. Similarly, films of the polyquinoline homopolymer (2),

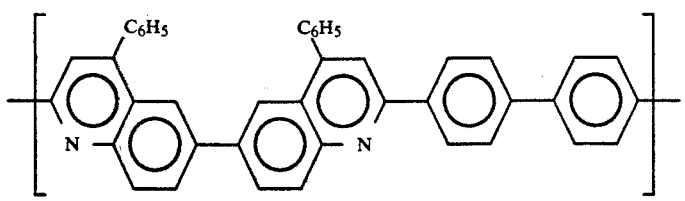

[Homopolymer (2)]

when examined by differential mechanical analysis exhibited a single tan δ with $T_{max}$ at 369° C. In contrast, a polyquinoline mixture prepared as described above and consisting of a 50:50 mixture of (1) and (2) exhibited two tan δ's with $T_{max}$ of 290° C. and 366° C. Similarly, a polyquinoline mixture consisting of a 90:10 mixture of (1):(2) exhibited two tan δ's with $T_{max}$ of 282° C. and 356° C. Thus, the polyquinoline mixtures exhibit properties distinctly different from those of either of the homopolymers (1) and (2).

The following examples are illustrative of the present invention but are not considered limiting thereof in any way.

EXAMPLE 1

Preparation of Poly[(4-phenylquinoline-2,6-diyl)oxy(4-phenylquinoline-6,2-diyl)-1,4-phenyleneoxy-1,4-phenylene]-Homopolymer (1)

A mixture of 0.5223 g (1.279 mmol) of 4,4'-diamino-3,3'-dibenzoyldiphenyl ether, 0.3252 g (1.279 mmol) of 4,4'-diacetyldiphenyl ether, 8.1 g (32 mmol) of diphenyl phosphate and 1.5 g (14 mmol) of distilled m-cresol was warmed in a three-necked polymerization flask (equipped with an overhead stirrer and nitrogen inlet and outlet) under a dynamic nitrogen purge until the diphenyl phosphate began to melt. Stirring was started while the dynamic purge was continued for 20 minutes. A 135°-140° C. oil bath was then raised around the flask, and the flask maintained at this temperature with vigorous stirring for 48 hours. The resulting clear, highly viscous, orange-yellow solution was poured slowly into a stirred solution of 500 ml of ethanol containing 50 ml of triethylamine to yield an off-white fibrous material. The fibrous polymer was suspended in a small amount (about 50 ml) of ethanol containing 10% v/v of triethylamine, chopped in a blender, and collected by filtration. The polymer was continuously extracted for 24 hours in a Soxhlet apparatus with ethanol containing 10% v/v triethylamine. It was then air-dried and further dried at 105° C. and 0.1 mmHg for 4 hours. The polymer was redissolved in 30 ml of chloroform and reprecipitated by slow addition to a stirred solution of 300 ml of ethanol containing 30 ml of triethylamine. The reprecipitated fibrous polymer was suspended in about 50 ml of ethanol containing 5 ml of triethylamine, chopped in a blender, collected by filtration, air-dried, and then further dried at 105° C. and 0.1 mmHg for 24 hours to yield 0.69 g of polymer. Dynamic mechanical analysis of a melt-pressed film (150° C., 20000 psi, 1 minute) gave a single tan δ with a $T_{max}$ of 276° C.

EXAMPLE 2

Preparation of Poly[(4,4'-diphenylyl-6,6'-biquinoline-2,2'-diyl)-4,4'-biphenylene]- Homopolymer (2)

To a 100-ml three-necked resin flask equipped with a mechanical stirrer and nitrogen inlet and outlet were added 3.0000 g (7.6440 mmol) of 3,3'-dibenzoylbenzidine, 1.8215 g (7.6440 mmol) of 4,4'-diacetylbiphenyl, 46.0 g (184 mmol) of diphenyl phosphate and 17 ml of freshly distilled m-cresol. The resin flask was dynamically purged with nitrogen and slowly heated until the diphenyl phosphate began to melt. Slow stirring was begun while the dynamic nitrogen purge was continued for 20 minutes. A 135°-140° C. oil bath was raised around the flask, and the stirring rate was increased. A static nitrogen atmosphere was maintained for the 48-hour period of the polymerization. A total of 100 ml of additional m-cresol was added in small portions during the 48-hour period to maintain efficient stirring. The deep red polymerization solution, while still hot, was poured into a stirred solution of 1 liter of ethanol containing 100 ml of triethylamine. The resultant yellow, fibrous solid was suspended in a small amount (150 ml) of ethanol containing 10% v/v of triethylamine and chopped in a blender. It was then continuously extracted for 24 hours with ethanol containing 10% v/v triethylamine and dried under vacuum (105° C., 0.1 mmHg) for 24 hours to afford a yellow fibrous polymer. Dynamic mechanical analysis of a cast film gave a single tan δ with a $T_{max}$ of 369° C.

EXAMPLE 3

Preparation of Blends of Homopolymers (1) and (2)

Blends of homopolymers (1) and (2) in varying proportions were prepared by slow dissolution of homopolymer (2) in a mixed solvent of 65:35 w/w % m-cresol:-di-m-cresyl phosphate. The solvent was added to the dry homopolymer (2) in a three-necked polymerization flask equipped with a nitrogen inlet and outlet and mechanical stirrer. The flask was purged with a dynamic nitrogen flow for 20 minutes and then heated to 85°-95° C. without stirring. Stirring was not begun for 24-48 hours, as this gave time for the solvent to swell the polymer. After stirring for at least 24 hours, the solution was checked for homogeneity at approximately 12-hour intervals under low magnification using crossed polarizers. Only 24 hours after homopolymer (2) appeared to be fully dissolved was the flask cooled and solid homopolymer (1) added to give the desired ratio of polymers. After purging for 20 minutes with dynamic nitrogen, the flask was placed under static nitrogen atmosphere and heated to 85°-95° C. with stirring. In general, optical microscopy indicated a uniform solution within 48 hours after the addition of homopolymer (1), but stirring was continued for a further 24 hours. Then m-cresol was added to give a final polymer concentration below 0.5 weight percent. The polymer solution was then filtered through a 40-60 micron fritted glass filter using positive pressure. Using a three-necked polymerization flask equipped with mechanical stirrer and short path condenser, the added m-cresol was vacuum-distilled (aspirator pressure, oil bath temperature of 150°-160° C.), giving the final polymer solution used for extrusion of film and fiber or precipitation of the blend powder.

EXAMPLE 4

Preparation of Polyquinoline Random Copolymer 0.687519 g (1.75181 mmol) of 3,3'-dibenzoylbenzidine, 0.417330 g (1.75136 mmol) of 4,4'-diacetylbiphenyl, 0.715331 g (1.75128 mmol) of 4,4'-diamino-3,3'-dibenzoyldiphenyl ether, and 0.445430 g (1.75167 mmol) of 4,4'-diacetyl diphenyl ether were added to a mechanical stirrer equipped 100-ml resin flask (with nitrogen inlet and outlet) containing 21 g diphenyl phosphate and 8.1 g freshly distilled m-cresol. The apparatus was slowly heated and dynamically purged with nitrogen until the diphenyl phosphate melted. The purge was continued for 20 minutes with stirring. The polymerization was then conducted as in Example 1 above (static nitrogen atmosphere, 135°–140° C. oil bath, vigorous stirring) for 48 hours. The hot polymerization mixture was precipitated into 1 liter of 10% triethylamine/ethanol, chopped and filtered. The polymer was extracted, using a Soxhlet apparatus, for 24 hours using 10% triethylamine/ethanol and dried overnight under vacuum (105° C., 0.1 mmHg). Dynamic mechanical analysis of a cast film gave a single tan δ with a $T_{max}$ of 316.5° C.

EXAMPLE 5

Preparation of Polyquinoline Block Copolymer

Degree of Polymerization (DP)=30 Block 2.999976 g (7.6448 mmol) of 3,3'-dibenzoylbenzidine and 1.720617 g (7.2207 mmol) of 4,4'-diacetylbiphenyl were added to a mechanical stirrer-equipped 200-ml resin flask (nitrogen inlet and outlet) containing 51 g of diphenyl phosphate and 17 ml freshly distilled m-cresol. The apparatus was purged for 20 minutes as described in Example 1 above, and the polymerization conducted as described above for 16 hours. The DP at this stage, calculated from the Carothers equation using P=0.995, is 30. The resin flask was cooled to room temperature, and 2.766466 g (6.7729 mmol) of 4,4'-diamino-3,3'-dibenzoyldiphenyl ether and 1.836142 g (7.2207 mmol) of 4,4'-diacetyldiphenyl ether were added, along with an additional 51 g of diphenyl phosphate. The apparatus was purged with nitrogen for 20 minutes, and the polymerization continued for a further 24 hours at 135°–140° C. During this period, an additional 35 ml of m-cresol was added. The hot polymerization mixture was precipitated into 1 liter 10% triethylamine/ethanol, was chopped and extracted, using a Soxhlet apparatus, for 24 hours with 10% triethylamine/ethanol. The polymer was vacuum-dried for 12 hours (0.1 mmHg, 105° C.) and further extracted with chloroform for an additional 24 hours. Extraction with chloroform resulted in a weight loss of less than 7 wt %. Finally, the polymer was vacuum-dried (0.1 mmHg, 105° C.) for 12 hours. Dynamic mechanical analysis of melt-pressed film (370° C., 30000 psi, 10 minutes) gave a single tan δ with a $T_{max}$ of 308° C.

EXAMPLE 6

Preparation of Polyquinoline Block Copolymer

Degree of Polymerization (DP)=100 Block 1.179532 g (4.9500 mmol) of 4,4'-diacetylbiphenyl and 1.962312 g (5.0000 mmol) of 3,3'-dibenzoylbenzidine with 1 g of diphenyl phosphate and 17 ml of freshly distilled m-cresol were polymerized as in Example 1 above for 16 hours. The DP at this stage, calculated from the Carothers equation using a P=0.995, is 100. After cooling of the resin flask, 1.098813 g (4.3211 mmol) of 4,4'-diacetyldiphenyl ether and 1.744208 g (4.2702 mmol) of 4,4'-diamino-3,3'-dibenzoyldiphenyl ether were added with an additional 1 g of diphenyl phosphate, and the polymerization continued as above for a further 48 hours. The polymer was isolated as described in Example 1 above. Dynamic mechanical analysis of a melt-pressed film (370° C., 30000 psi, 10 minutes) gave a single tan δ with a $T_{max}$ of 308° C.

EXAMPLE 7

Preparation of Polyquinoline Tri-Block Copolymer 1.179532 g (4.9500 mmol) of 4,4'-diacetylbiphenyl and 1.962312 g (5.0000 mmol) of 3,3'-dibenzoylbenzidine with 51 g of diphenyl phosphate and 17 ml of freshly distilled m-cresol are polymerized as in Example 1 above for 16 hours. After the resin flask is cooled, 3.33 g (10.0 mmol) of 3-benzoyl4-amino,4'-acetyldiphenyl ether is added with an additional 50 g of diphenyl phosphate, and the polymerization is continued as above for a further 48 hours. The polymer is isolated as described in Example 1 above. The resulting tri-block copolymer will have a rigid-rod central block with DP=50 and two flexible side blocks with DP dependent on the precise amount of flexible AB type monomer added in the second step. For many applications, the precise amount of AB monomer added is not as critical as the precise amounts of AA and BB type monomers used in the first step, which determines the DP of the central block.

Although this invention has been described in considerable detail with reference to certain embodiments thereof, it will be understood that variations and modifications can be effected within the spirit and scope of this invention as described above and defined in the appended claims.

What is claimed is:

1. A polyquinoline copolymer composition comprising the reaction product of a mixture of compounds selected from the group of mixtures consisting of (1) at least one type AA compound, at least one type BB compound, and at least one type AB compound; (2) at least one type AA compound and at least one type BB compound, where the total number of different type AA and type BB compounds is at least three; and (3) at least three different type AB compounds, wherein:

the type AA compounds are aromatic compounds containing two sets of ortho-amino carbonyl functions attached to an aromatic nucleus selected from the group consisting of structures represented by the formulas:

   (1)

   (2)

the type BB compounds are aromatic compounds containing two methylene ketone functions attached to an aromatic nucleus selected from the group consisting of structures represented by the formulas:

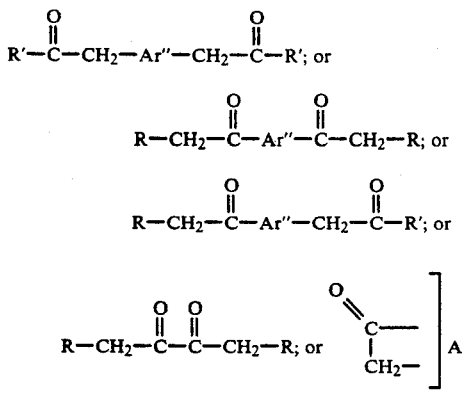

the type AB compounds are aromatic compounds containing one set of ortho-amino carbonyl functions as well as one methylene ketone function attached to an aromatic nucleus selected from the group consisting of structures represented by the formulas:

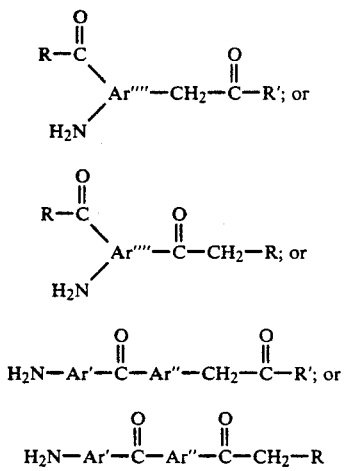

wherein R is hydrogen or aryl, R' is Aryl, and Ar is an aromatic nucleus in which the positions of attachment of each set of carbonyl and amino functions are ortho, Ar' is any aryl in which the positions of attachment of the amino functions are ortho, Ar" is any aryl group, Ar'" is an aryl group, four positions of which are occupied by connections of the methylene carbonyl functions, and Ar"" is an aryl group in which the positions of attachment of the set of carbonyl and amino functions is ortho.

2. A copolymer composition as defined in claim 1 wherein the mixture includes at least one type AA compound having an aromatic nucleus, Ar, and wherein the Ar of at least one of such type AA compounds is monocyclic.

3. A copolymer composition as defined in claim 1 wherein the mixture includes at least one type AA compound having an aromatic nucleus, Ar, and wherein the Ar of at least one of such type AA compounds is polycyclic.

4. A copolymer composition as defined in claim 1 wherein the mixture includes at least one type AA compound having an aromatic nucleus, Ar', and wherein the Ar' of at least one of such type AA compounds is monocyclic.

5. A copolymer composition as defined in claim 1 wherein the mixture includes at least one type AA compound having an aromatic nucleus, Ar', and wherein the Ar' of at least one of such type AA compounds is polycyclic.

6. A copolymer composition as defined in claim 1 wherein the mixture includes at least one type AA compound having an aromatic nucleus, Ar", and wherein the Ar" of at least one of such type AA compounds is monocyclic.

7. A copolymer composition as defined in claim 1 wherein the mixture includes at least one type AA compound having an aromatic nucleus, Ar", and wherein the Ar" of at least one of such type AA compounds is polycyclic.

8. A copolymer composition as defined in claim 1 wherein the mixture includes at least one type AB compound having an aromatic nucleus, Ar, and wherein the Ar of at least one of such type AB compounds is monocyclic.

9. A copolymer composition as defined in claim 1 wherein the mixture includes at least one type AB compound having an aromatic nucleus, Ar, and wherein the Ar of at least one of such type AB compounds is polycyclic.

10. A copolymer composition as defined in claim 1 wherein the mixture includes at least one type AB compound having an aromatic nucleus, Ar', and wherein the Ar' of at least one of such type AB compounds is monocyclic.

11. A copolymer composition as defined in claim 1 wherein the mixture includes at least one type AB compound having an aromatic nucleus, Ar', and wherein the Ar' of at least one of such type AB compounds is polycyclic.

12. A copolymer composition as defined in claim 1 wherein the mixture includes at least one type AB compound having an aromatic nucleus, Ar", and wherein the Ar" of at least one of such type AB compounds is monocyclic.

13. A copolymer composition as defined in claim 1 wherein the mixture includes at least one type AB compound having an aromatic nucleus, Ar", and wherein the Ar" of at least one of such type AB compounds is polycyclic.

14. A copolymer composition as defined in claim 1 wherein the mixture includes at least one type AA compounds and at least one of the type AA compounds is in the form of a dihydrochloride salt.

15. A copolymer composition as defined in claim 1 wherein the mixture includes at least one type AB compounds and at least one of the type AB compounds is in the form of a hydrochloride salt.

16. A copolymer composition as defined in claim 1 wherein the mixture includes at least one type BB compound having an aromatic nucleus, Ar", and wherein the Ar" of at least one of such type BB compounds is monocyclic.

17. A copolymer composition as defined in claim 1 wherein the mixture includes at least one type BB compound having an aromatic nucleus, Ar", and wherein the Ar" of at least one of such type BB compounds is polycyclic.

18. A copolymer composition as defined in claim 1 wherein the mixture includes at least one type BB compound having an aromatic nucleus, Ar''', and wherein the Ar''' at least one of such type BB compounds is structured such that the two methylene carbonyl functions are joined by two bridging aromatic nuclei which are each monocyclic.

19. A copolymer composition as defined in claim 1 wherein the mixture includes at least one type BB compound having an aromatic nucleus, Ar''', and wherein the Ar''' of at least one of such type BB compounds is structured such that the two methylene carbonyl functions are joined by a polycyclic bridging aromatic nucleus.

20. A copolymer composition as defined in claim 1 wherein the mixture includes at least one type AA compound having the structural formula:

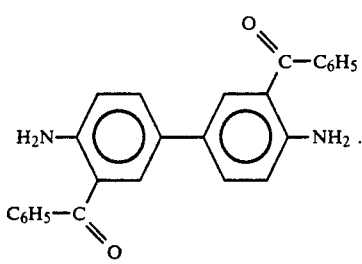

21. A copolymer composition as defined in claim 1 wherein the mixture includes at least one type AA compound having the structural formula:

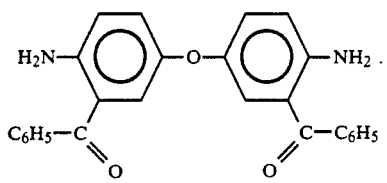

22. A copolymer composition as defined in claim 1 wherein the mixture includes at least one type AA compound having the structural formula:

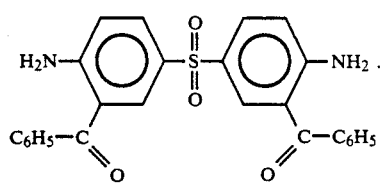

23. A copolymer composition as defined in claim 1 wherein the mixture includes at least one type AA compound having the structural formula:

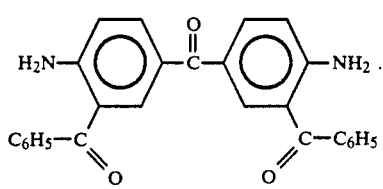

24. A copolymer composition as defined in claim 1 wherein the mixture includes at least one type AA compound having the structural formula:

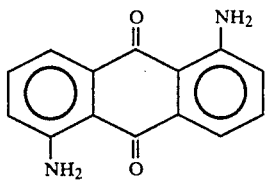

25. A copolymer composition as defined in claim 1 wherein the mixture includes at least one type BB compound having the structural formula:

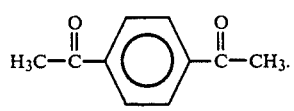

26. A copolymer composition as defined in claim 1 wherein the mixture includes at least one type BB compound having the structural formula:

27. A copolymer composition as defined in claim 1 wherein the mixture includes at least one type BB compound having the structural formula:

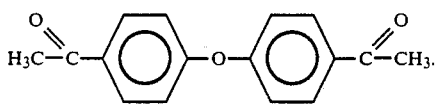

28. A copolymer composition as defined in claim 1 wherein the mixture includes at least one type BB compound having the structural formula:

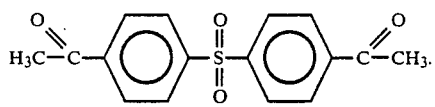

29. A copolymer composition as defined in claim 1 wherein the mixture includes at least one type BB compound having the structural formula:

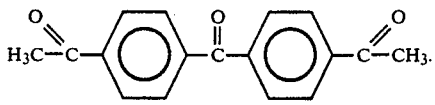

30. A copolymer composition as defined in claim 1 wherein the mixture includes at least one type of AB compound having the structural formula:

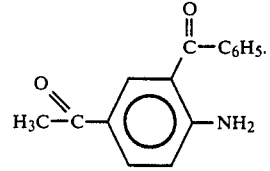

31. A copolymer composition as defined in claim 1 wherein the mixture includes at least one type of AB compound having the structural formula:

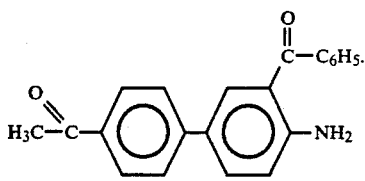

32. A copolymer composition as defined in claim 1 wherein the mixture includes at least one type of AB compound and having the structural formula:

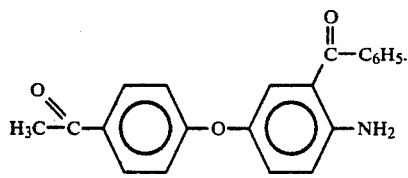

33. A copolymer composition as defined in claim 1 wherein the mixture includes at least one type of AB compound having the structural formula:

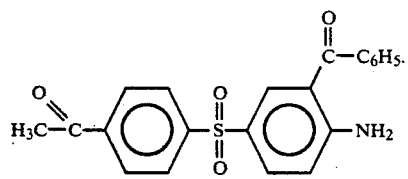

34. A copolymer composition as defined in claim 1 wherein the mixture includes at least one type of AB compound having the structure formula:

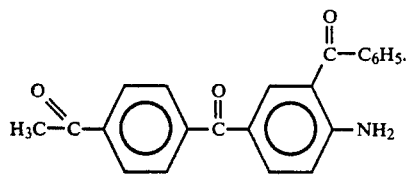

35. A copolymer composition as defined in claim 1 comprising the reaction product of a mixture comprising at least one type AA compound, at least one type BB compound, and at least one type AB compound.

36. A copolymer composition as defined in claim 1 comprising the reaction product of a mixture comprising at least one type AA compound, at least one type BB compound, and at least one type AB compound, wherein the mole percent of each of the compounds selected is at least 1 percent.

37. A copolymer composition as defined in claim 1 comprising the reaction product of a mixture comprising at least one type AA compound and at least one type BB compound, in the absence of type AB compounds, wherein the total number of different type AA and type BB compounds is at least three.

38. A copolymer composition as defined in claim 1 comprising the reaction product of a mixture comprising at least one type AA compound and at least one type BB compound in the absence of type AB compounds, wherein the total number of type AA and type BB compounds is at least three, and wherein the mole percent of each of the compounds of type AA and type BB selected is at least one percent.

39. A copolymer composition as defined in claim 1 comprising the reaction product of a mixture comprising least three type AB compounds in the absence of type AA and type BB compounds.

40. A copolymer composition as defined in claim 1 comprising the reaction product of a mixture comprising at least three type AB compounds in the absence of type AA type BB compounds, wherein the mole percent of each such type AB compound is at least one percent.

41. A copolymer composition as described in claim 1 wherein the polyquinoline polymers formed are block copolymers.

42. A method for preparing polyquinoline block copolymers, the method comprising:
  (a) in a first step, preparing a first reaction mixture of compounds selected from the group consisting of (1) at least one type AA compound, at least one type BB compound, and at least one type AB compound; (2) at least one type AA compound and at least one type BB compound, wherein the total number of different type AA and type BB compounds is at least three; and (3) at least two type AB compounds, wherein, when the type AA and BB compounds are used, the total number of moles of type AA compounds is equal to the total number of moles of type BB compounds, and reacting the first mixture for a selected period of time to provide a reacted first mixture; and after the selected period of time
  (b) in a second step, adding to the reacted first mixture a second mixture of compounds to provide a second reaction mixture, the second mixture of compounds selected from the group consisting of (1) at least one type AA compound, at least one type BB compound, and at least one type AB compound; (2) at least one type AA compound and at least one type BB compound, wherein the total number of different type AA and type BB compounds is at least three; and (3) at least two type AB compounds, wherein the second mixture of compounds includes at least one type AA, type BB or type AB compound which was not used in the first step, and the second reaction mixture is allowed to react for a selected period of time.

43. A polymer composition as described in claim 1 wherein the polyquinoline polymers are block copolymers comprising both rigid-rod and non-rigid-rod segments.

44. A method for preparing polyquinoline block copolymers, the method comprising:
  (a) mixing together at least one non-rigid-rod type AA compound, at least one non-rigid-rod type BB compound, and a number of rigid-rod type AB compounds selected from the group consisting of zero and at least one type AB compound, wherein the total number of moles of non-rigid-rod type AA compounds is equal to the total number of moles of non-rigid-rod type BB compounds, and wherein the mixture is allowed to react for a first selected period of time;
  (b) after the first selected period of time, adding to the reaction mixture at least one rigid-rod type AA compound, at least one rigid-rod type BB compound, and a number of rigid-rod type AB compounds selected from the group consisting of zero and at least rigid-rod type AB compounds, and (c) allowing the reaction to continue for a second selected period of time.

45. A method for preparing polyquinoline block copolymers, the method comprising:
(a) mixing together at least one rigid-rod type AA compound, at least one rigid-rod type BB compound, and a number of rigid-rod type AB compounds selected from the group consisting of zero and at least one rigid-rod type AB compound, wherein the total number of moles of rigid-rod type AA compounds is equal to the total number of moles of rigid-rod type BB compounds, and wherein the mixture is allowed to react for a first selected period of time;
(b) after the first selected period of time, adding to the reaction mixture at least one non-rigid-rod type AA compound, at least one non-rigid-rod type BB compound, and a number of rigid-rod type AB compounds selected from the group consisting of zero and at least one non-rigid-rod type AB compound; and
(c) allowing the reaction to continue for a second selected period of time.

46. A method for preparing polyquinoline block copolymers, the method comprising:
(a) mixing together at least one non-rigid-rod type AA compound, at least one non-rigid-rod type BB compound, and a number of rigid-rod type AB compounds selected from the group consisting of zero and at least one non-rigid-rod type AB compound, wherein the total number of moles of non-rigid-rod type AA compounds is equal to the total number of moles of non-rigid-rod type BB compounds, and wherein the mixture is allowed to react for a first selected period of time;
(b) after the first selected period of time, adding at least one rigid-rod type AB compound to the reaction mixture; and
(c) allowing the reaction to continue for a second selected period of time.

47. A method for preparing polyquinoline block copolymers, the method comprising:
(a) mixing together at least one-rigid-rod type AA compound, at least one rigid-rod type BB compound, and a number of rigid-rod type AB compounds selected from the group consisting of zero and at least one rigid-rod type AB compound, wherein the total number of moles of rigid-rod type AA compounds is equal to the total number of moles of rigid-rod type BB compounds, and wherein the mixture is allowed to react for a first selected period of time;
(b) after the first selected period of time, adding at least one non-rigid-rod type AB compound to the reaction mixture; and
(c) allowing the reaction mixture to continue for a second selected period of time.

48. A method for preparing polyquinoline block copolymers, the method comprising:
(a) mixing together at least one non-rigid-rod type AA compound, at least one non-rigid-rod type BB compound, and a number of rigid-rod type AB compounds selected from the group consisting of zero and at least one non-rigid-rod type AB compound, wherein the total number of moles of non-rigid-rod type AA compounds is equal to the total number of moles of non-rigid-rod type BB compounds, and wherein the mixture is allowed to react until the viscosity of the reaction mixture indicates that the desired average polymer molecular weight has been attained; and
(b) after said desired average molecular weight is attained, adding at least one rigid-rod type AA compound, at least one rigid-rod type BB compound, and a number of rigid-rod type AB compounds selected from the group consisting of zero and at least one rigid-rod type AB compound to the reaction mixture; and
(c) allowing the reaction to continue for a selected period of time.

49. A method for preparing polyquinoline block copolymers, the method comprising:
(a) mixing together at least one rigid-rod type AA compound, at least one rigid-rod type BB compound, and a number of rigid-rod type AB compounds selected from the group consisting of zero and at least one rigid-rod type AB compound, wherein the total number of moles of rigid-rod type AA compounds is equal to the total number of moles of rigid-rod type BB compounds, and wherein the mixture is allowed to react until the viscosity of the reaction mixture indicates that the desired average polymer molecular weight has been attained;
(b) after the desired average polymer molecular weight has been attained, adding at least one non-rigid-rod type AA compound, at least one non-rigid-rod type BB compound, and a number of rigid-rod type AB compounds selected from the group consisting of zero and at least one non-rigid-rod type AB compound to the reaction mixture; and
(c) allowing the reaction to continue for a selected period of time.

50. A method for preparing polyquinoline block copolymers, the method comprising:
(a) mixing together at least one non-rigid-rod type AA compound, at least one non-rigid-rod type BB compound, and a number of rigid-rod type AB compounds selected from the group consisting of zero and at least one non-rigid-rod type AB compound, wherein the total number of moles of non-rigid-rod type AA compounds is equal to the total number of moles of non-rigid-rod type BB compounds, and wherein the mixture is allowed to react until the viscosity of the reaction mixture indicates that the desired average polymer molecular weight has been attained;
(b) after the desired average polymer molecular weight has been attained, adding at least one rigid-rod type AB compound to the reaction mixture; and
(c) allowing the reaction to continue for a selected period of time.

51. A method for preparing polyquinoline block copolymers, the method comprising:
(a) mixing together at least one rigid-rod type AA compound, at least one rigid-rod type BB compound, and a number of rigid-rod type AB compounds selected from the group consisting of zero and at least one rigid-rod type AB compound, wherein the total number of moles of rigid-rod type AA compounds is equal to the total number of moles of rigid-rod type BB compounds, and wherein the mixture is allowed to react until the viscosity of the reaction mixture indicates that the desired average polymer molecular weight has been attained;

(b) after the desired average polymer molecular weight has been attained, adding at least one non-rigid-rod type AB compound to the reaction mixture; and (c) allowing the reaction to continue for a selected period of time.

52. A method for preparing polyquinoline block copolymers, the method comprising:

(a) mixing together at least one non-rigid-rod type AA compound, at least one non-rigid-rod type BB compound, and a number of rigid-rod type AB compounds selected from the group consisting of zero and at least one non-rigid-rod type AB compound, wherein the total number of moles of non-rigid-rod type AA compounds is not equal to the total number of moles of non-rigid-rod type BB compounds, and wherein the mixture is allowed to react until all of the non-rigid-rod compounds are fully reacted;

(b) after all of the non-rigid-rod compounds are fully reacted, adding at least one rigid-rod type AA compound, at least one rigid-rod type BB compound, and a number of rigid-rod type AB compounds selected from he group consisting of zero and at least one rigid-rod type AB compound to the reaction mixture; and (c) allowing the reaction to continue for a selected period of time.

53. A method for preparing polyquinoline block copolymers, the method comprising:

(a) mixing together at least one rigid-rod type AA compound, at least one rigid-rod type BB compound, and a number of rigid-rod type AB compounds selected from the group consisting of zero and at least one rigid-rod type AB compound, wherein the total number of moles of rigid-rod type AA compounds is not equal to the total number of moles of rigid-rod type BB compounds, and wherein the mixture is allowed to react until all of the rigid-rod compounds are fully reacted;

(b) after all of the rigid-rod compounds are fully reacted, adding at least one non-rigid-rod type AA compound, at least one non-rigid-rod type BB compounds, and a number of rigid-rod type AB compounds selected from the group consisting of zero and at least one non-rigid-rod type AB compound to the reaction mixture; and (c) allowing the reaction to continue for a selected period of time.

54. A method for preparing polyquinoline block copolymers, the method comprising:

(a) in a first step, forming a first reaction mixture by mixing together at least one type AA compound with at least one type AB compound and reacting the mixture until all of the compounds are fully reacted to thereby provide a reacted mixture; and (b) in a second step, adding to the reacted mixture a second mixture selected from the group consisting of (1) at least one type AA compound, at least one type BB compound, and at least one type AB compound; (2) at least one type AA compound and at least one type BB compound, wherein the total number of different type AA and BB compounds is at least three; and (3) at least two type AB compounds, wherein at least one of the type AA, type BB, or type AB compounds in the second mixture was not used in the first mixture and in which second mixture the total number of type BB compounds and of type AB compounds is at least one, and wherein the combined first reacted mixture and second mixture are allowed to react for a selected period of time.

55. A method for preparing polyquinoline block copolymers, the method comprising:

(a) in a first step, forming a first reaction mixture by mixing together at least one type BB compound with at least one type AB compound and reacting the mixture until all of the compounds are fully reacted to thereby provide a reacted mixture; and (b) in a second step, adding to the reacted mixture a second mixture selected from the group consisting of (1) at least one type AA compound, at least one type DB compound, and at least one type AB compound; (2) at least one type AA compound and at least one type BB compound, wherein the total number of different type AA and type BB compounds is at least three; and (3) at least two type AB compound, wherein at least one of the type AA, type BB, or type AB compounds in the second mixture was not used in the first mixture and in which second mixtures the total number of type AA compounds and of type AB compounds is at least one, and wherein the combined first reacted mixture and second mixture are allowed to react for a selected period of time.

56. A polymer composition as defined in claim 1 wherein the polyquinoline copolymer is a tri-block copolymer having three polyquinoline segments, wherein the first segment is selected from the group consisting of a polyquinoline homo-oligomer or a polyquinoline co-oligomer and the remaining two segments are identical and are selected from the group consisting of polyquinoline homo-oligomers and polyquinoline co-oligomers but are of a different type than the first segment, and wherein each of the second segments are connected to one end of the first segment.

57. A method for preparing polyquinoline tri-block copolymers described in claim 56, the method comprising:

(a) mixing together at least one type AA compound, at least one type BB compound, and a number of rigid-rod type AB compounds selected from the group consisting of zero and at least one type AB compound, wherein the total number of moles of type AA compounds is not equal to the total number of moles of type BB compounds, and wherein the mixture is allowed to react until the reaction is completed;

(b) after the reaction is completed, adding at least one type AB compound to the reaction mixture; and (c) allowing the reaction mixture to react fully.

58. A polyquinoline copolymer composition as defined in claim 1 wherein the polyquinoline copolymers are tri-block copolymers comprising a single field rigid-rod segment and two non-rigid-rod segments, wherein one such non-rigid-rod segment is connected to each end of the rigid-rod segment.

59. A method for preparing polyquinoline tri-block copolymers described in claim 58, the method comprising:

(a) mixing together at least one rigid-rod type AA compound, at least one rigid-rod type BB compound, and a number of rigid-rod type AB compounds selected from the group consisting of zero and at least one rigid-rod type AB compound, wherein the total number of moles of rigid-rod type AA compounds is not equal to the total number of moles of rigid-rod type BB compounds, and wherein the mixture is allowed to react until all of the rigid-rod compounds are fully reacted;

(b) after all of the rigid-rod compounds are fully reacted, adding at least one non-rigid-rod type AB compound to the reaction mixture; and (c) allowing the reaction mixture to react fully.

60. A polyquinoline copolymer composition as defined in claim 1 wherein the polyquinoline copolymers are tri-block copolymers having a single non-rigid-rod segment and two rigid-rod segments, wherein each of such rigid-rod segments are connected to each end of the non-rigid-rod segment.

61. A method for preparing polyquinoline tri-block copolymers described in claim 60, the method comprising:

(a) mixing together at least one non-rigid-rod type AA compound, at least one non-rigid-rod type BB compound, and a number of non-rigid-rod type AB compounds selected from the group consisting of zero and at least one non-rigid-rod type AB compound, wherein the total number of moles of non-rigid-rod type AA compounds is not equal to the total number of moles of non-rigid-rod type BB compounds, and wherein the mixture is allowed to react until all of the non-rigid-rod compounds are fully reacted;

(b) after all of the non-rigid-rod compounds are fully reacted, adding at least one rigid-rod type AB compound to the reaction mixture; and (c) allowing the reaction mixture to react fully.

62. A method for preparing a polyquinoline mixture composition, the method comprising:

(a) dissolving at least two polyquinoline polymers in a solvent mixture consisting of at least one solvent in which solvent mixture all of the selected polyquinoline polymers are sufficiently soluble and wherein the polyquinoline polymers are selected from the group consisting of polyquinoline homopolymers and polyquinoline copolymers; and (b) evaporating the solvent from the resultant solution to yield the polyquinoline mixture composition.

63. A method for preparing a polyquinoline mixture composition, the method comprising:

(a) dissolving at least two polyquinoline polymers in a solvent mixture consisting of at least one solvent in which solvent mixture all of the selected polyquinoline polymers are sufficiently soluble and wherein the polyquinoline polymers are selected from the group consisting of polyquinoline homopolymers and polyquinoline copolymers; and (b) adding at least one additional solvent to the resulting solution to cause the polyquinoline mixture composition to precipitate from solution.

64. The polyquinoline mixture composition as is described in claim 63 wherein the solvent added to precipitate the polyquinoline mixture composition is a solvent in which the selected polyquinoline polymers are soluble to an extent less than 0.1 grams per liter.

65. The polyquinoline mixture composition as is described in claim 63 wherein the solvent added to precipitate the polyquinoline mixture composition is water.

66. The polyquinoline mixture composition as is described in claim 63 wherein the solvent added to precipitate the polyquinoline mixture composition is an alcohol.

67. The polyquinoline mixture composition as is described in claim 63 wherein the total concentration of polyquinoline polymers in the solution used ranges from about 0.01 weight percent up to about 50 weight percent.

68. The polyquinoline mixture composition as is described in claim 63 wherein the total concentration of polyquinoline polymers in the solution used ranges from a concentration of from about 0.01 weight percent up to a high concentration which is below the concentration at which the solution becomes anisotropic.

69. The polyquinoline mixture composition as is described in claim 63 wherein the total concentration of polyquinoline polymers in the solution used ranges from a concentration of from about 1.0 weight percent of polymer per liter of solution up to a concentration at which the solution becomes anisotropic.

* * * * *

UNITED STATES PATENT AND TRADEMARK OFFICE
CERTIFICATE OF CORRECTION

PATENT NO. : 5,017,677

DATED : May 21, 1991

INVENTOR(S) : John K. Stille

Page 1 of 2

It is certified that error appears in the above-identified patent and that said Letters Patent is hereby corrected as shown below:

At column 3, line 55, after "polymers" insert a period.
at column 19, line 13, change "Ar'" to -- Ar'' --;
at column 19, line 65, after "Acta." change "7" to -- 27 --;
at column 20, line 2, change "diaminoisophthalopheneone" to -- diaminoisophthalophenone --;
at column 22, line 25, after "complete" insert a period;
at column 22, line 53, after "reaction" insert a period;
at column 25, lines 53, 54, after "copolymers" insert a period;
at column 28, line 59, change "P +" to -- P= --;
at column 33, line 59, change "20000" to -- 20,000 --;
at column 35, line 57, change "30000" to -- 30,000 --;
at column 35, line 66, after "with" change "1" to -- 51 --;
at column 38, line 51, after "type AA", change "compounds" to -- compound --;
at column 38, line 55, after "type AB", change "compounds" to -- compound --;

UNITED STATES PATENT AND TRADEMARK OFFICE
CERTIFICATE OF CORRECTION

PATENT NO. : 5,017,677
DATED : May 21, 1991
INVENTOR(S) : John K. Stille

It is certified that error appears in the above-identified patent and that said Letters Patent is hereby corrected as shown below:

```
at column 39, line 2, after "Ar'''" insert -- of --;
at column 42, line 6, before "least" insert -- at --;
at column 42, line 34, after "time" insert -- ; and --;
at column 43, line 3, after "least" insert -- one --;
at column 45, line 28, change "he" to -- the --;
at column 45, line 48, after "BB" change "compounds" to
-- compound --;
at column 46, line 19, after "type" change "DB" to -- BB --; and
at column 46, line 23, change "type" to -- types --.
```

Signed and Sealed this

Twelfth Day of January, 1993

Attest:

DOUGLAS B. COMER

*Attesting Officer*         *Acting Commissioner of Patents and Trademarks*